US009807679B2

United States Patent
Gupta

(10) Patent No.: US 9,807,679 B2
(45) Date of Patent: Oct. 31, 2017

(54) METHODS FOR PERFORMING WIRELESS COMMUNICATIONS, MOBILE TERMINAL DEVICES, AND SERVERS

(71) Applicant: Intel IP Corporation, Santa Clara, CA (US)

(72) Inventor: Anshul Kumar Gupta, Bangalore (IN)

(73) Assignee: INTEL IP CORPORATION, Santa Clara, CA (US)

( * ) Notice: Subject to any disclaimer, the term of this patent is extended or adjusted under 35 U.S.C. 154(b) by 128 days.

(21) Appl. No.: 14/860,760

(22) Filed: Sep. 22, 2015

(65) Prior Publication Data

US 2017/0086131 A1    Mar. 23, 2017

(51) Int. Cl.
*H04L 5/00*  (2006.01)
*H04W 48/14* (2009.01)
*H04W 72/04* (2009.01)
*H04W 48/20* (2009.01)

(52) U.S. Cl.
CPC .......... *H04W 48/14* (2013.01); *H04W 48/20* (2013.01); *H04W 72/042* (2013.01)

(58) Field of Classification Search
None
See application file for complete search history.

(56) References Cited

U.S. PATENT DOCUMENTS

2010/0248708 A1* 9/2010 Koivisto ............... H04L 1/0003 455/419
2011/0039575 A1   2/2011 Castillo et al.
2011/0263282 A1* 10/2011 Rune .................... H04J 11/0093 455/507
2012/0015667 A1   1/2012 Woo et al.
2014/0211762 A1* 7/2014 Bontu ................... H04W 36/30 370/332
2014/0256348 A1   9/2014 Wirola et al.
2015/0350928 A1* 12/2015 Zhang ................. H04W 52/244 370/252

FOREIGN PATENT DOCUMENTS

WO    2011055182 A2    5/2011

OTHER PUBLICATIONS

International Search Report and the written opinion based on Application No. PCT/US2016/047944 (9 Pages) dated Nov. 22, 2016 (Reference Purpose Only).

* cited by examiner

*Primary Examiner* — Fan Ng
(74) *Attorney, Agent, or Firm* — Viering, Jentschura & Partner mbB

(57) ABSTRACT

A mobile terminal device may include a radio processing circuit configured to transmit communication data indicating a serving cell, the communication data intended for a server and receive system information of one or more proximate cells of the serving cell indicated by the communication data. The mobile terminal device may also include a baseband processing circuit configured to determine if system information of a target cell is included in the received system information of the one or more proximate cells, and, if the system information of the target cell is included in the received system information of the one or more proximate cells, apply the received system information of the target cell to control the radio processing circuit to transmit or receive data.

22 Claims, 9 Drawing Sheets

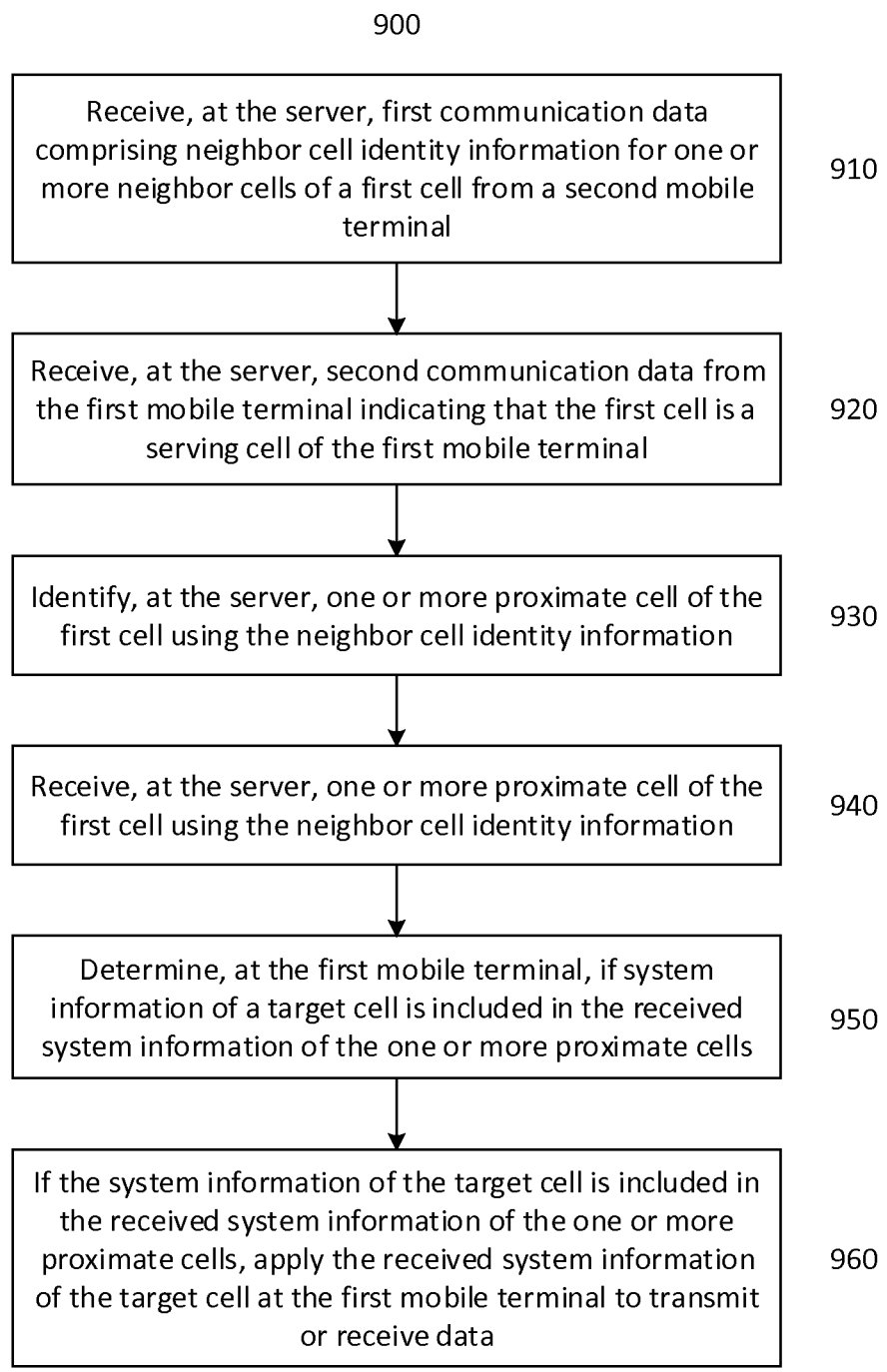

METHODS FOR PERFORMING WIRELESS COMMUNICATIONS, MOBILE TERMINAL DEVICES, AND SERVERS

TECHNICAL FIELD

Various embodiments relate generally to methods for performing wireless communications, mobile terminal devices, and servers.

BACKGROUND

Mobile terminals operating on a Long Term Evolution (LTE) air interface as specified by the 3rd Generation Partnership Project (3GPP) may utilize system information messages including System Information Blocks (SIB) and Master Information Blocks (MIB) to communicate with base stations. Different LTE system information messages may each contain a variety of important information essential to wireless communication on over an LTE air interface, such as channel bandwidth, network identities, cell identities and other information, paging configurations, power control information, cell search/measurement parameters, etc.

Analogous system information messages may be utilized for other Radio Access Technologies (RAT), such as the counterpart SIB and MIB in Universal Mobile Telecommunications System (UMTS) and System Information (SI) messages in Global System for Mobile Communications (GSM).

A mobile terminal may require different system information messages (e.g. SIB, MIB, and SI) depending on the current state of the mobile terminal. For example, certain events such as cell selection, cell reselection, handover, measurement reporting, etc., may result in a need for a mobile terminal to obtain certain system information by receiving and decoding a given system information message over the wireless air interface.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 9 shows a method for performing wireless communications between a first mobile terminal device and a server.

DESCRIPTION

Figure 1:
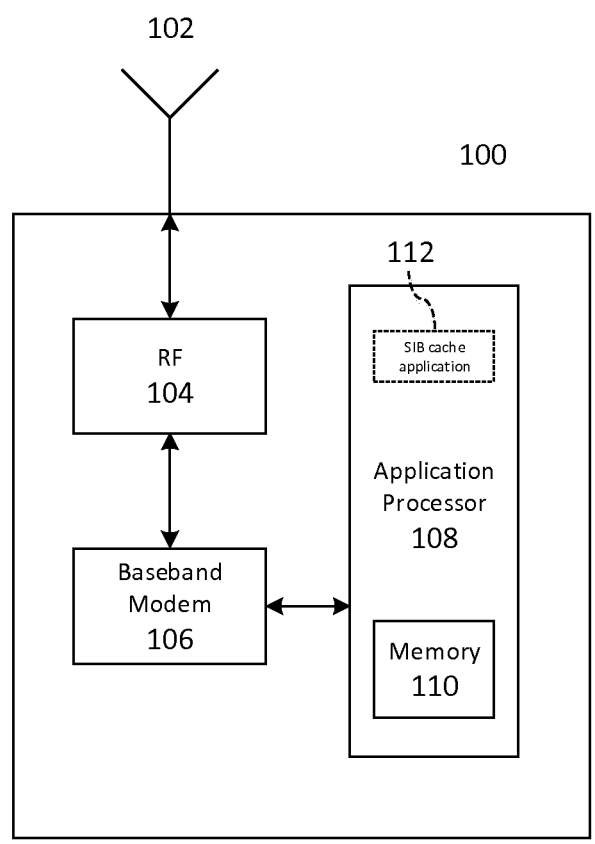
FIG. 1 shows an internal configuration of a mobile terminal device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry"

in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "radio idle mode" used in reference to a mobile terminal refers to a radio control state in which the mobile terminal is not allocated at least one dedicated communication channel of a mobile communication network. The term "radio connected mode" used in reference to a mobile terminal refers to a radio control state in which the mobile terminal is allocated at least one dedicated communication channel of a mobile communication network.

Unless explicitly specified, the terms "transmit" and "send" encompass both direct and indirect transmission/sending. Similarly, the term "receive" encompasses both direct and indirect reception unless explicitly specified.

Cells in conventional radio access networks (RAN), in particular cells operating in accordance with a network standard specified by the $3^{rd}$ Generation Partnership Project (3GPP), may transmit system information messages containing important information for proximate mobile terminals. Specific examples include Master Information Blocks (MIB) and System Information Blocks (SIB) for Long Term Evolution (LTE) and Universal Mobile Telecommunications System (UMTS) networks and System Information (SI) messages in Global System for Mobile Communications (GSM) networks. Mobile terminals operating on any such air interface may require parameters specified in such system information messages in order to perform a number of important operations, including camping/connecting to cells, performing uplink transmissions and downlink reception, performing cell and/or network searches and measurements, etc.

The various possible states of mobile terminals may affect the types of system information required by a given mobile terminal at a specific point in time. For example, a mobile terminal performing cell selection or reselection in radio idle mode may only need to read several basic system information messages from a newly selected serving cell in order to effectively camp thereon. In contrast, a mobile terminal in radio connected mode may need to read multiple further system information messages immediately following a handover in order to fulfill the requirements of a radio connected mode connection.

In addition to the aforementioned cell selection/reselection and handover cases, mobile terminals may need to read system information messages to obtain identification information of detected cells, such as during network (e.g. Public Land Mobile Network (PLMN)) and/or cells scans. A further particular case exists in LTE network configurations where a mobile terminal may be requested to identify a cell global identity (CGI) of a cell detected during e.g. measurement reporting. Accordingly, the mobile terminal may need to read System Information Block type 1 (SIB1) from the detected cell and provide the obtained CGI back to the mobile communication network, e.g. back to a current serving cell.

Mobile terminals may therefore experience a number of different scenarios in which system information messages must be read over the air interface. Accordingly, a mobile terminal may need to dedicate receiver and processing resources, in addition to supporting power resources, to perform reception and decoding of system information messages over the air interface. Such procedures may be time consuming and inherently in increased power usage, and may be common to mobile terminals operating according to numerous network standards, including the aforementioned LTE, UMTS, and GSM standards.

Accordingly, as opposed to requiring air interface access to obtain desired system information, a mobile terminal may be configured to locally store system information for one or more proximate cells, and may subsequently utilize the locally stored system information in the event that system information for one of the proximate cells is needed. Such may conserve power and result in faster acquisition of system information.

A server may be provided containing a database of system information corresponding to comprehensive set of cells. The server may be configured to, upon request by a participating mobile terminal, provide system information for one or more proximate cells relative to the mobile terminal. The server may be configured to determine which cells qualify as proximate cells, such as based on an indication from the mobile terminal specifying a current serving cell and/or location information. The server may identify one or more proximate cells based on such information and provide the connected system information for the proximate cells to the mobile terminal.

The system information stored in the database may be provided by one or more mobile terminals, where each participating mobile terminal may provide conventionally received system information to the database along with identification information of the cells corresponding to the system information.

The server may perform an association operation on the database in order to identify cells that are related, such as in identifying a list of one or more proximate cells for each stored cell in the database. The server may determine the proximate cell associations based on further information received from participating mobile terminals. For example, mobile terminals may receive system information over the air interface, which may be part of conventional mobile operations or may be triggered specifically in order to obtain system information to provide to the database. The mobile terminals may receive system information for a particular cell in addition to performing detection and/or measurements on other proximate cells, and may additionally transmit any obtained information of the detected and/or measured cells to the server along with system information of the particular cell. The detected proximate cells may therefore be considered "neighbor cells" of the particular cell. The server may then utilize the information of the detected and/or measured cells to associate the detected and/or measured cells with the particular cell as proximate cells as the particular cell. Additionally, the server may associate further cells as proximate cells of a given cell, such as neighbor cells of neighbor cells of the proximate cell. Accordingly, the term "proximate cells" as utilized herein in reference to a given cell may refer to neighbor cells of the given cell, neighbor cells of neighbor cells of the given, etc., or cells that are identified for other reasons as being located in proximity to the given cell.

Accordingly, the server may build a system of proximate cell relationships between each cell stored in the database. Further information may be utilized in order to determine such neighbor cell relationships, including e.g. location information (e.g. from Global Positioning System (GPS) data)) provided by a participating mobile terminal.

Accordingly, a mobile terminal may transmit information to the server that indicates a current serving cell of the mobile terminal (which may be e.g. explicit identification information of the current serving cell or implicit identification information of the serving cell, such as only location information). In response, the server may determine if system information for any proximate cells associated with the indicated current serving cell is stored in the database, and, if so, provide the system information for the proximate cells to the mobile terminal. The mobile terminal may receive and locally store the system information for the serving cells in case the system information is required at a later time. For example, the mobile terminal need to perform cell selection/reselection, handover, or cell reporting (e.g. CGI reporting) on one of the proximate cells, such as e.g. as a result of mobility of the mobile terminal. As opposed to needing to read the system information over the air interface from the proximate cell, thus utilizing resources, the mobile terminal may instead access the locally stored system information of the proximate cell, thereby allowing for faster acquisition of system information in addition to conserving power.

Participating mobile terminals may interact with the server using a dedicated application running on e.g. an application processor of the participating mobile terminals or using dedicated components in e.g. a baseband modem of the participating terminals. Due to the limitation on uplink resources in radio idle mode, a mobile terminal may operate using a "handshake" procedure, as will be later detailed.

FIG. 1 shows a block diagram illustrating an internal configuration of mobile terminal 100 according to an aspect of the disclosure. Mobile terminal 100 may be configured to transmit information indicating a current serving cell of mobile terminal 100 to a server. Mobile terminal 100 may then be configured to receive system information for one or more proximate cells (e.g. neighbor) of the current serving cell and subsequently locally store the system information for the one or more proximate cells. Mobile terminal 100 may then be configured to identify a target cell, which may be e.g. a new serving cell of mobile terminal 100 following cell selection, cell reselection, handover, or e.g. a cell targeted for measurement or reporting by mobile terminal 100, such as e.g. a cell targeted for CGI reporting. Mobile terminal 100 may access the locally stored system information to identify if the target cell is one of the one or more proximate cells, and, if the target cell is one of the one or more proximate target cells, mobile terminal 100 may retrieve the stored system information for the target cell and utilize the retrieved system information for the target cell to transmit or receive wireless data. Mobile terminal 100 may thus avoid reading system information over the air interface for the proximate cell, and may therefore acquire system information in reduced time as well as conserve power.

As illustrated in FIG. 1, mobile terminal 100 may include antenna 102, radio frequency (RF) transceiver 104, baseband modem 106, and application processor 108, which may include memory 110 and SIB cache application 112. As shown in FIG. 1, the aforementioned components of mobile terminal 100 may be implemented as separate components. However, it is appreciated that the architecture of mobile terminal 100 depicted in FIG. 1 is for purposes of explanation, and accordingly one or more of the aforementioned components of mobile terminal 100 may be integrated into a single equivalent component or divided into two separate components with collective equivalence. It is understood that mobile terminal 100 may have one or more additional components, such as additional hardware, software, or firmware elements. For example, mobile terminal 100 may further include various additional components including hardware, firmware, processors, microprocessors, memory, and other specialty or generic hardware/processors/circuits, etc., in order to support a variety of additional operations. Mobile terminal 100 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

It is appreciated that the aforementioned components of mobile terminal 100, in particular, RF transceiver 104, baseband modem 106, and application processor 108 may be implemented in a number of different manners, such as by hardware, firmware, software executed on hardware (e.g. a processor), or any combination thereof. Various option include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed, in an aspect of the disclosure mobile terminal 100 may be a mobile terminal device having a radio processing circuit (RF transceiver 104) and a baseband processing circuit (baseband modem 106) adapted to interact with the radio processing circuit. Mobile terminal 100 may be configured to transmit communication data indicating a serving cell, the communication data intended for a server, receive system information of one or more proximate cells of the serving cell in response to the communication data, identify if system information of a target cell is included in the received system information of the one or more proximate cells, and if the system information of the target cell is included in the received system information of the one or more proximate cells, applying the received system information of the target cell to transmit or receive data.

In an abridged overview of the operation of mobile terminal 100, mobile terminal 100 may be configured to receive and/or transmit wireless signals according to multiple different wireless access protocols or radio access technologies (RATs), including any one of or any combination of, LTE (Long Term Evolution), WLAN wireless local area network), WiFi, UMTS (Universal Mobile Telecommunications System), GSM (Global System for Mobile Communications Bluetooth, CDMA (Code Division Multiple Access), Wideband CDMA (W-CDMA), etc. The RAT capabilities of mobile terminal 104 may be determined by one or more Subscriber Identity Modules (SIM) included in mobile terminal 104 (not explicitly shown in FIG. 1). It is appreciated that separate components may be provided for each distinct type of compatible wireless signals, such as a dedicated LTE antenna, RF transceiver, and baseband modem for LTE reception and transmission and a dedicated WiFi antenna, RF transceiver, and baseband modem for WiFi reception and transmission. Alternatively, one or more components of mobile terminal 100 may be shared between different wireless access protocols, such as e.g. by sharing antenna 102 between multiple different wireless access protocols. In an exemplary aspect of disclosure, transceiver 104 and/or baseband modem 106 may be operate according to multiple mobile communication access protocols (i.e. "multi-mode"), and thus may be configured to support one or more of LTE, UMTS, and/or GSM access protocols.

Further according to the abridged overview of operation of mobile terminal 100, RF transceiver 104 may receive radio frequency wireless signals via antenna 102, which may be implemented as e.g. a single antenna or an antenna array composed of multiple antennas. RF transceiver 104 may include e.g. analog circuitry, configured to process externally received signals, such as mixing circuitry to convert externally received RF signals to baseband and/or intermediate frequencies. RF transceiver 104 may also include amplification circuitry to amplify externally received signals, such as power amplifiers (PAs) and/or Low Noise Amplifiers (LNAs), although it is appreciated that such components may also be implemented separately. RF transceiver 104 may additionally include various transmission circuitry elements configured to transmit internally received signals, such as e.g. baseband and/or intermediate frequency signals provided by baseband modem 106, which may include mixing circuitry to modulate internally received signals onto one or more radio frequency carrier waves and/or amplification circuitry to amplify internally received signals before transmission. RF transceiver 104 may provide such signals to antenna 102 for wireless transmission. Further references herein to reception and/or transmission of wireless signals by mobile terminal 100 may thus be understood as an interaction between antenna 102, RF transceiver 104, and baseband modem 106 as detailed above. Although not explicitly depicted in FIG. 1, RF transceiver 104 may be additionally be connected to application processor 108.

Figure 2:
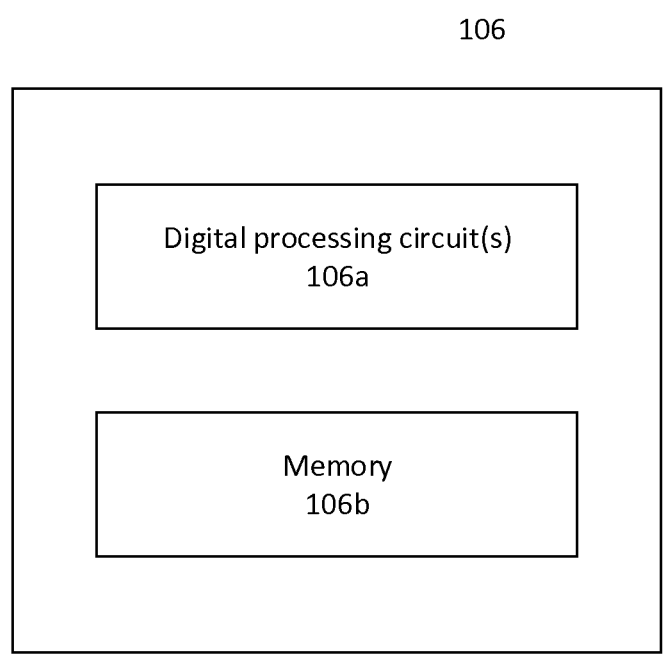
FIG. 2 shows an internal configuration of a baseband modem.

FIG. 2 shows a block diagram illustrating an internal configuration of baseband modem 106 according to an aspect of the disclosure. Baseband modem 106 may include digital processing circuit(s) 106a (i.e. one or more digital processing circuits) and baseband memory 106b. Although not explicitly shown in FIG. 2, baseband modem 106 may contain one or more additional components, including one or more analog circuits.

Digital processing circuit(s) 106a may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) 106a may include hardware, software, or a combination of hardware and software. Specifically, digital processing circuit(s) 106a of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 106 may be detailed herein substantially in terms of functional operation in recognition that a person of skill in the art may readily appreciate the various possible structural realizations of baseband modem 106 using digital processing circuitry that will provide the desired functionality.

Baseband memory 106b may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. Baseband memory 106b may be configured to store software elements, which may be retrieved and executed using a processor component of digital processing circuitry 106a. Although depicted as a single component in FIG. 1, baseband memory 106b may be implemented as one or more separate components in baseband modem 106. Baseband memory 106b may also be partially or fully integrated with digital processing circuitry 106a.

Baseband modem 106 be configured to operate one or more protocol stacks, such as a GSM protocol stack, a UMTS protocol stack, an LTE protocol stack, etc. Baseband modem 106 may be "multimode" and may thus be configured to operate in accordance with multiple RATs by executing multiple protocol stack instances simultaneously. Digital processing circuitry 106a may therefore include a processor configured to execute program code in accordance with the protocol stacks of each associated RAT. Baseband memory 106a may be configured to store the aforementioned program code. Although not explicitly depicted in FIG. 1, baseband modem 106 may be configured to control one or more further components of UE 100, in particular one or more microphones and/or speakers, such as by providing output audio signals to one or more speakers and/or receiving input audio signals from one or more microphones.

The protocol stack(s) of baseband modem 106 may be configured to control operation of baseband modem 106, such as in order to transmit and receive mobile communication signals using antenna 102, RF transceiver 104, and other audio components (e.g. audio transducers including microphone(s) and/or speaker(s)) in accordance with the corresponding RAT(s).

Application processor 108 may be implemented as a Central Processing Unit (CPU), and may function as a controller for mobile terminal 100. Application processor 108 may be configured to execute various applications and/or programs of mobile terminal 100, such as e.g. applications corresponding to program code stored in a memory component of mobile terminal 100 (not explicitly shown in FIG. 1). Application processor 108 may also be configured to control one or more further components of mobile terminal 100, such as user input/output devices (display(s), keypad(s), touchscreen(s), speaker(s), external button(s), camera(s), microphone(s), etc.), peripheral devices, memory, power supply, external device interfaces, etc.

As shown in FIG. 1, application processor 108 may include memory 110 in addition to e.g. one or more further memory components (not explicitly shown in FIG. 1). Application processor 108 may utilize memory 110 to store data corresponding to e.g. applications executed on application processor 108. As will be later detailed, application processor 108 may execute SIB cache application 112, such as by retrieving program code corresponding to SIB cache application 112 from memory 110 and executing SIB cache application 112 as software. Application processor 108 may further be configured to control user input and/or output devices in accordance with the operation of SIB cache application 112, such as to facilitate user interaction with SIB cache application 112.

Although baseband modem 106 and application processor 108 are depicted separately in FIG. 1, it is appreciated that this illustration is not limiting in nature. Accordingly, it is understood that baseband modem 106 and application processor 108 may be implemented separately, implemented together (i.e. as an integrated unit), or partially implemented together.

Figure 3:
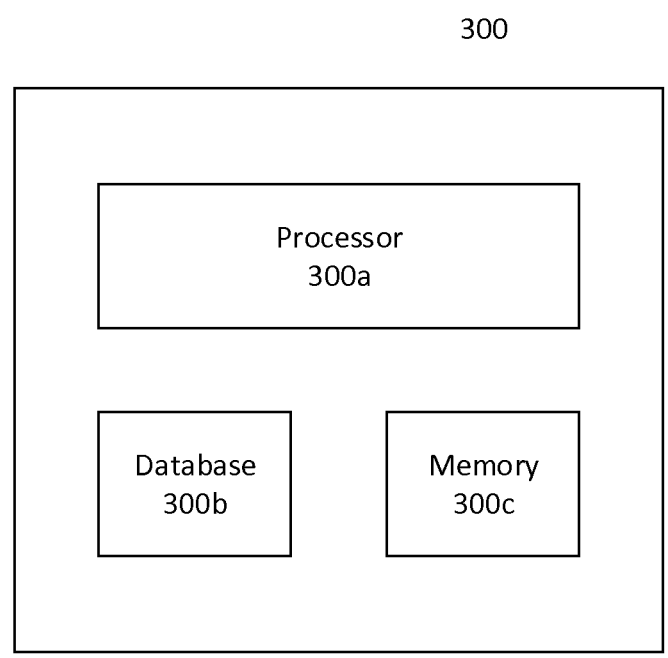
FIG. 3 shows an internal configuration of a server.

As previously indicated, mobile terminal 100 may be further configured to interact with a server. FIG. 3 shows a block diagram illustrating an internal configuration of SIB cache server 300 according to an aspect of the disclosure.

As illustrated in FIG. 3, SIB cache server 300 may include processor 300a, memory 300c, and database 300b. Processor 300a may be an entity implementing digital logic circuitry in order to perform operations on data, such as according to program code (i.e. software) stored on a memory, e.g. memory 300c. Processor 300a may thus be e.g. a logic circuit(s), processor(s), scalar processor(s), vector processor(s), microprocessor(s), controller(s), microcontroller(s), Central Processing Unit(s) (CPU), Graphics Processing Unit(s) (GPU), etc., or any combination thereof.

SIB cache server 300 may store information in database 300, such as system information (e.g. information contained in MIB, SIB, SI, etc.) of one or more cells of one or more radio access networks. SIB cache server 300 may additionally store further information of cells, such as cell identities (e.g. Physical Cell Identity (PCI), Primary Scrambling Code (PSC), etc.), measurement results, frequencies (i.e. system center frequencies, frequency bands, Absolute Radio Frequency Numbers (ARFCN), evolved ARFCNs (EARFCN), etc.), network identities (e.g. PLMN ID), RAT, and a list of proximate (i.e. neighbor) cells linked with stored system information for one or more of the proximate neighbor cells.

Processor 300a may control reception of system information for storage in database 300b, such as by receiving system information (i.e. information contained in system information messages received from a cell) and/or cell identity information (i.e. basic cell information obtained by detecting, synchronizing, and/or measuring a given cell) from a mobile terminal (as will be later detailed) and storing the received information in a corresponding location within database 300b, such as with other related cell information. System information may include cell global identity system information, such as the PLMN ID, Area Code, and/or Cell ID of a given cell contained in the primary system information message (e.g. SIB1 for LTE, MIB for UMTS, and SI Type 1 for GSM). System information may also include further system information from system information messages, which may be in encoded (i.e. the encoded system information message) or decoded (i.e. decoded parameters from a system information message).

Processor 300a may also be configured to identify one or more proximate cells, i.e. neighbor cells, for each cell stored in database 300*b*. As previously indicated, processor 300*a* may perform such proximate cell association using information received from participating mobile terminals, such as information obtained during neighbor cell measurements of a given serving cell, or using location information.

Processor 300*a* may also control information requests, such as by receiving information from a mobile terminal indicating a current serving cell of the requesting mobile terminal. Processor 300*a* may then access database 300*b* in order to retrieve system information, if any, of any proximate cells to the indicated current serving cell (based on the aforementioned association operations), and subsequently transmit the system information to the requesting mobile terminal.

As will be further detailed, SIB cache server 300 may include a memory (database 300*b*) and may be configured to receive neighbor cell identity information of one or more neighbor cells of a first cell, the neighbor cell identity information derived from a first mobile terminal, receive communication data indicating that the first cell is a serving cell of a second mobile terminal, the communication data derived from the second mobile terminal, identify one or more proximate cells of the first cell using the neighbor cell identity information, and transmit system information of the one or more proximate cells to the second mobile terminal.

Operation of mobile terminal 100 and SIB cache server 300, in addition to the related interactions therebetween, will now be explained in further detail.

Figure 4:
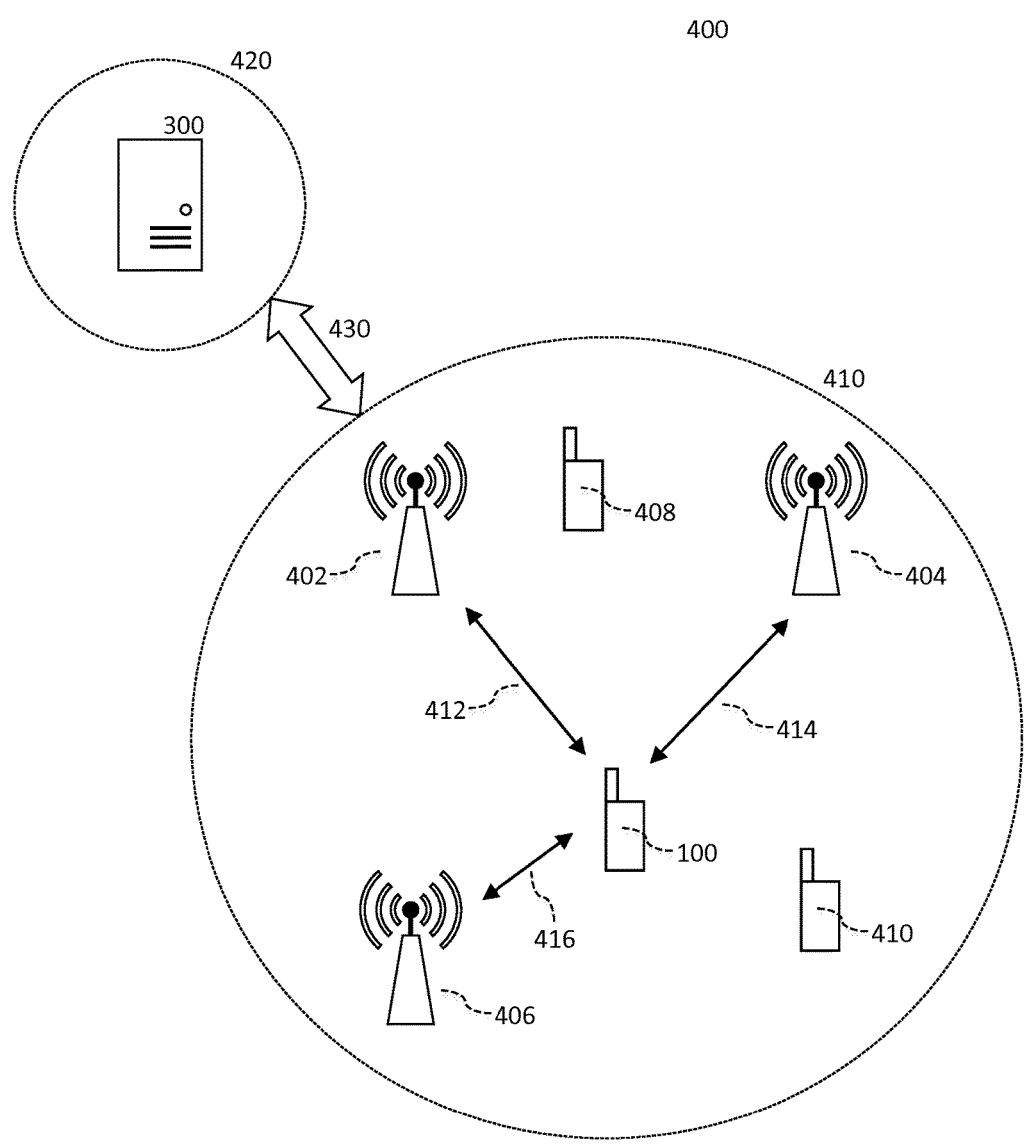
FIG. 4 shows a network system.

FIG. 4 shows network system 400, which includes mobile communication network 410, packet data network 420, and network interface 430. As shown in FIG. 4, SIB cache server 300 may be included in packet data network 420. Mobile communication network 410 may include base stations 402, 404, and 406, which may be included in a radio access portion of mobile communication network 410. Although not explicitly shown in FIG. 4, mobile communication network 410 may also include a core network section, which may be connected to each of base stations 402-406. Base stations 402-406 may therefore operate as an interface between mobile terminal 100 and the core network section of mobile communication network 410. As shown in FIG. 4, mobile terminal 100 may share air interfaces 412-416 with each of respective base stations 402-406, where each of air interfaces 412-416 may provide mobile terminal 100 with a wireless access channel with each of respective base stations 402-406.

Network interface 430 may operate as an interface between mobile communication network 410 and packet data network 420, such as an interface between the core network section of mobile communication network 410 and packet data network 420. For example, in accordance with an LTE configuration, network interface 430 may be an SGi interface between a Packet Data Network Gateway (PDN-GW) of the core network section of mobile communication network and packet data network 420. Similar analogous architectures may also be provided for other RATs. Accordingly, network interface 430 may connect mobile communication network to packet data network 420, to which SIB cache server 300 may be connected as shown in FIG. 4. For example, packet data network 420 may include access to the internet, thereby allowing SIB cache server 300 to be connected to the internet and accordingly interacted with by mobile terminal 100 via mobile communication network 410. SIB cache server 300 may therefore be accessible by substantially any mobile terminal with an active internet connection (e.g. worldwide).

Accordingly, mobile terminal 100 may interact with SIB cache server 300 via one (or more) of air interfaces 412-416, base stations 402-406, one or more core network components of mobile communication network 410, network interface 430, and packet data network 420.

In an alternative exemplary aspect of the disclosure, SIB cache server 300 may be directly incorporated as a component of mobile communication network 410, such as e.g. as a core component of mobile communication network 410, and thus may be provided with a more direct path with mobile terminal 100 while still being available for straightforward access by multiple base stations, e.g. base stations 402-406. Regardless of such alternative variations, it is appreciated the descriptions herein will be similarly applicable, as mobile terminal 100 may be provided with a connection to SIB cache server 300. Such variations are thus embraced herein.

In a further alternative aspect of the disclosure, SIB cache server 300 may be incorporated as a component of one of base stations 402-406. For purposes of explanation, SIB cache server 300 maybe locally incorporated as part of base station 402, although it is appreciated that separate realizations of SIB cache server 300 may be implemented at one or more further base stations. SIB cache server 300 may be available to interact with any mobile terminals currently connected to base station 402, and may assemble database 300*b* based on cell system and identity information received from mobile terminals connected to base station 402 over time. The cell identity and system information stored at SIB cache server 300 may therefore be limited based on location, as SIB cache server 300 may only be provided with cell identity and system information for cells located proximate to base station 402. However, such may still prove valuable in identifying proximate cells to a mobile terminal connected to base station 402. In such a scenario, SIB cache application 112 may be executed as part of baseband modem 106, and may allow a more direct interface between mobile terminal 100 and SIB cache server 300 that is not required to pass through a core network section of mobile communication network 410 to packet data network 420.

Mobile terminal 100 may include SIB cache application 112, which may be e.g. software, dedicated to interact with SIB cache server 300. For example, program code corresponding to SIB cache application 112 may be stored on memory 110 and may be executed by application processor 108 (or e.g. baseband memory 106*b* and digital processing circuit(s) 106*a*, respectively). Additionally, SIB cache application 112 may have access to memory 110 in order to store certain system and/or cell identity information. Memory 110 may thus be composed of a single dedicated memory component or multiple separate memory components. As will be detailed, SIB cache application 112 may be configured to interact with baseband modem 106, such as by using Attention (AT) commands exchanged on an application processor-baseband modem interface, such as to exchange system and cell identity information.

Accordingly, mobile terminal 100 may utilize SIB cache application 112 in conjunction with baseband modem 106 to interact with SIB server 300 in order to retrieve target system information from SIB server 300. Mobile terminal 100 may therefore avoid reading system information messages (i.e. MIB, SIB, SI, etc.) over the air interface in certain scenarios, e.g. if mobile terminal 100 has previously received the target system information from SIB server 300. By avoiding the need to read system information messages over the air interface, mobile terminal 100 may improve power consumption, selection/reselection time, and CGI measurement reporting.

The operation of SIB cache application 112 as executed on application processor 108 may be summarized as follows:

- Collect serving cell identity information (RAT, system frequency, physical cell ID) (i.e. received from modem) from baseband modem 106 for current serving cell of mobile terminal 100
- Collect serving cell system information (including serving cell global identity system information PLMN ID, Area Code, Cell ID from primary system information message and further serving cell system information from other system information messages including paging information, power control information, multimedia (e.g. evolved Multicast Broadcast Multicast Services (eMBMS)) information, cell search/measurement parameters, etc.) from baseband modem 106 for the current serving cell based on any received system information messages from the current serving cell
  - (Optional) Collect further cell system information as encoded system information messages (SIB/MIB/SI messages) from baseband modem 106
  - (Optional) Collect location coordinates for a given cell identity (RAT, system frequency, physical cell ID)
- Collect proximate cell identity information (RAT, system frequency, physical cell ID) and any other relevant information (measurement results, PLMN ID, etc.) from baseband modem 106, i.e. based on performed measurements and/or cell search
  - (Optional) Collect proximate cell system information from baseband modem 106
- Update serving cell identity and system information, proximate cell identity and system (if available) information to SIB cache server 300 (in radio connected mode or via a secondary network connection (e.g. WiFI))
- Retrieve cell identity and system information for any proximate cells of the current serving cell from SIB cache server 300 and provide to baseband modem 106 (in radio connected mode or via a secondary network connection, i.e. handshake)

SIB cache server 300 may be configured to interact with mobile terminal 100 and one or more additional participating mobile terminals (e.g. mobile terminal 408 and 410, which may both be configured substantially similarly to mobile terminal 100 with a corresponding baseband modem and application processor executing a respective instance of SIB cache application 112). The operation of SIB cache server 300 as controlled by processor 300a may be summarized as follows:

- Receive serving cell identity (RAT, system frequency, physical cell ID) and system information (serving cell global identity system information including PLMN ID, Area Code, and Cell ID from primary system information message and further serving cell system information from other system information messages including paging information, power control information, multimedia (e.g. eMBMS) information, cell search/measurement parameters, etc.) from any participating mobile terminals (e.g. mobile terminal 100, 408, and 410)
  - (Optional) Receive further serving cell system information as encoded system information messages (SIB/MIB/SI messages)
- Receive neighbor cell identity information (RAT, system frequency, physical cell ID) from any participating mobile terminals
  - (Optional) Receive neighbor cell global identity information (PLMN ID, Area Code, Cell ID) from any participating mobile terminals
  - (Optional) Receive further neighbor cell system information (paging information, power control information, multimedia (e.g. eMBMS) information, cell search/measurement parameters, etc.) from any participating mobile terminals
    - (Optional) Receive further neighbor cell system information as encoded system information messages (SIB/MIB/SI messages)
- Assemble database 300b with received serving and neighbor cell identity and system information provided by participating mobile terminals, where each cell is stored with any available system information according to cell identity information (RAT, system frequency, and physical cell ID) and any available cell global identity serving information (PLMN ID, Area Code, and/or Cell ID)
- Organize database 300b upon receiving serving or neighbor cell identity or system information to associate all cells with any identified proximate cells (i.e. neighbor cells) based on proximate cells identified by participating mobile terminals (i.e. based on cell search/measurements) and/or location information
- Provide proximate cell list (according to proximate cell identity information (RAT, system frequency, and physical cell ID) any available proximate cell global identity system information (PLMN ID, Area Code, and Cell ID)) along with any further proximate cell system information when requested by SIB cache application of a participating mobile terminal for an indicated cell (indicated by system frequency, RAT, and/or physical cell ID, and/or optionally, if available, PLMN ID, Cell ID, Area Code, and/or location information)
  - (Optional) Provide further proximate cell system information as encoded system information messages (SIB/MIB/SI messages)

The operation of baseband modem 106 as controlled by digital processing circuit(s) 106a may be summarized as follows:

- Retrieve proximate cell list for a current serving cell along with any stored system information for each cell of the proximate cell list from SIB cache server 300 (via SIB cache application 112) and store system and cell information for each cell of the proximate cell list in non-volatile memory (e.g. Non-volatile Random Access Memory (NVRAM) of a local cache of baseband memory 106b
- Retrieve system information for target cell (e.g. new serving cell following cell selection/reselection, new serving cell following handover, or target cell for CGI reporting specified by the mobile communication network) from baseband memory 106b (e.g. NVRAM of local cache) if available and apply retrieved system information to transmit and/or receive data
  - (Optional) Read primary system information message over the air interface from the target cell (e.g. MIB in UMTS, SIB1 for LTE, or SI Type 1 for GSM) to ensure that the system information value tag has not changed from the retrieved system information
    - (Optional) If value tag has expired: discard retrieved system information from the target cell, read any required system information messages over the air interface from the target cell, and update system information messages for the target cell at SIB cache server 300 via SIB cache application 112

Update SIB cache application 112 with serving cell system and identity information and detected proximate cell identity or system information (if available) obtained from neighbor cell measurements and search (Optional) Retrieve proximate cell identity and/or system information by triggering independent proximate cell search/measurement and/or reading proximate cell system information messages Accordingly, mobile terminal 100 may avoid reading system information messages for a target cell in certain scenarios if mobile terminal 100 has previously obtained target cell system information from SIB cache server 300 (via baseband modem 106 and SIB cache application 112). For example, SIB cache application 112 may periodically perform a "handshake" operation with SIB cache server 300, where SIB cache application 112 indicates the current serving cell of mobile terminal 100 to SIB cache server 300 (such as e.g. explicitly according to cell identity information or implicitly according to location information of mobile terminal 100). SIB cache server 300 may access database 300*b* to identify proximate cells for the indicated serving cell (i.e. using neighbor cells identified by participating mobile terminals as a result of cell search/measurement) and subsequently provide any stored cell identity and system information for the proximate cells to SIB cache application 112. In particular for further cell system information, SIB cache server 300 may provide encoded system information messages to SIB cache application 112, although it is appreciated that SIB cache server 300 may alternatively store system information in decoded form. SIB cache application 112 may provide the proximate cell identity and system information to baseband modem 106, which may locally store the cell identity and system information in non-volatile memory of baseband memory 106*b*. If SIB cache server 300 provided any of the system information as encoded system information messages, baseband modem 106 may decode the system information messages to retrieve the system information contained in each system information message.

Accordingly, in the event that mobile terminal 100 requires system information for one of the proximate cells, the system information may be locally stored (e.g. in encoded or decoded form) at baseband modem 106*b*. Baseband modem 106*b* may retrieve the system information instead of reading the system information over the air interface, thus saving time and power. Such may be performed in e.g. radio idle mode or radio connected mode, as the system information is locally stored. However, it is appreciated that the mobile terminal 100 may only be able to perform the "handshake" while a network connection is active, such as either while mobile terminal 100 is in radio connected mode or while a secondary network connection, such as e.g. WiFi, is active. Both radio connected mode and a secondary network connection (e.g. WiFi or any another access technology offering Internet access) may allow SIB cache application 112 to exchange data with SIB cache server 300, e.g. as packet data using either mobile communication or WiFi protocols (e.g. over the Internet using WiFi, which may be available regardless of mobile terminal 100 is an radio idle mode or radio connected mode). Mobile terminal 100 may therefore perform a handshake between SIB cache application 112 and SIB cache server 300 e.g. each time mobile terminal enters into radio connected mode and/or obtains a secondary network connection. Furthermore, mobile terminal 100 may perform such a handshake each time the serving cell of mobile terminal 100 changes, and/or each time the system information of a serving cell changes (according to a system information value tag included in the system information). 1

Mobile terminal 100 may also provide newly obtained cell identity and/or system information to SIB cache server 300 during such a handshake. For example, mobile terminal 100 may have read system information from a given cell, which may be the current serving cell of mobile terminal 100, e.g. as the desired system information for the given cell was not locally stored at mobile terminal 100. Mobile terminal 100 may have read serving cell global identity system information (PLMN ID, Area Code, and Cell ID) from the primary system information message (e.g. SIB1 for LTE, MIB for UMTS, or SI Type 1 for GSM) and optionally further serving cell system information (paging information, power control information, multimedia (e.g. evolved Multicast Broadcast Multicast Services (eMBMS)) information, cell search/measurement parameters, etc.) from one or more further system information messages. Alternatively or additionally, mobile terminal 100 may have read cell identity information for one or more cells, including one or more neighbor cells of the current serving cell. Baseband modem 106 may have obtained the cell identity and system information and provided the cell identity and system information to SIB cache application 112. As previously indicated, baseband modem 106 may provide the further cell system information in encoded form, e.g. as encoded system information messages, or may provide the further cell system information in decoded form, e.g. as decoded system information. Upon entering radio connected mode or obtaining a secondary network connection (e.g. WiFi), SIB cache application 112 may perform a handshake with SIB cache server 300 in order to provide SIB cache server 300 with the cell identity and system information. SIB cache server 300 may store the cell identity and system information, such as by storing the system information with the given cell in addition to creating/updating a proximate cell list for the current serving cell based on the cell identity information provided for the one or more neighbor cells. SIB cache server 300 may then utilize the newly stored cell identity and system information to provide further participating mobile terminals with cell identity and system information.

Accordingly, the cell identity information and cell system information received by SIB cache server 300 may be applied for specific purposes. SIB cache server 300 may store system information (in e.g. either encoded or decoded form) in order to provide the system information for one or more proximate cells to a serving cell identified by a mobile terminal. SIB cache server 300 may utilize cell identity information to identify proximate cells for each cell stored in database 300*b*. For example, SIB cache server 300 may receive cell identity and system information for a given serving cell from mobile terminal 100. SIB cache server 300 may also receive cell identity information for one or more neighbor cells of the given serving, which mobile terminal 100 may have obtained while performing cell search and/or measurement while connected to the given serving cell. SIB cache server 300 may thus determine that the one or more neighbor cells are neighbor cells of the given serving cell, and may thus provide system information for the one or more neighbor cells to a mobile terminal indicating that its current serving cell is the given serving cell. SIB cache server 300 may identify further cells than cells specifically identified as a neighbor cell of the given serving cell, such as neighbor cells of neighbor cells and/or cells located in geographical proximity. Accordingly SIB cache server 300 may provide system information for one or more proximate cells for a given serving cell to a mobile terminal in response to the mobile terminal indicating the given serving cell is the current serving cell of the mobile terminal, where the one or more proximate cells may include cells explicitly identified as neighbor cells (e.g. during cell search and/or measurement) by a reporting mobile terminal, neighbor cells of neighbor cells, other cells located in geographic proximity to the given serving cell, etc. SIB cache server 300 may therefore utilize cell identity information for reported neighbor cells in order to determine proximate cell relations for each cell stored in database 300*b*.

Figure 5:
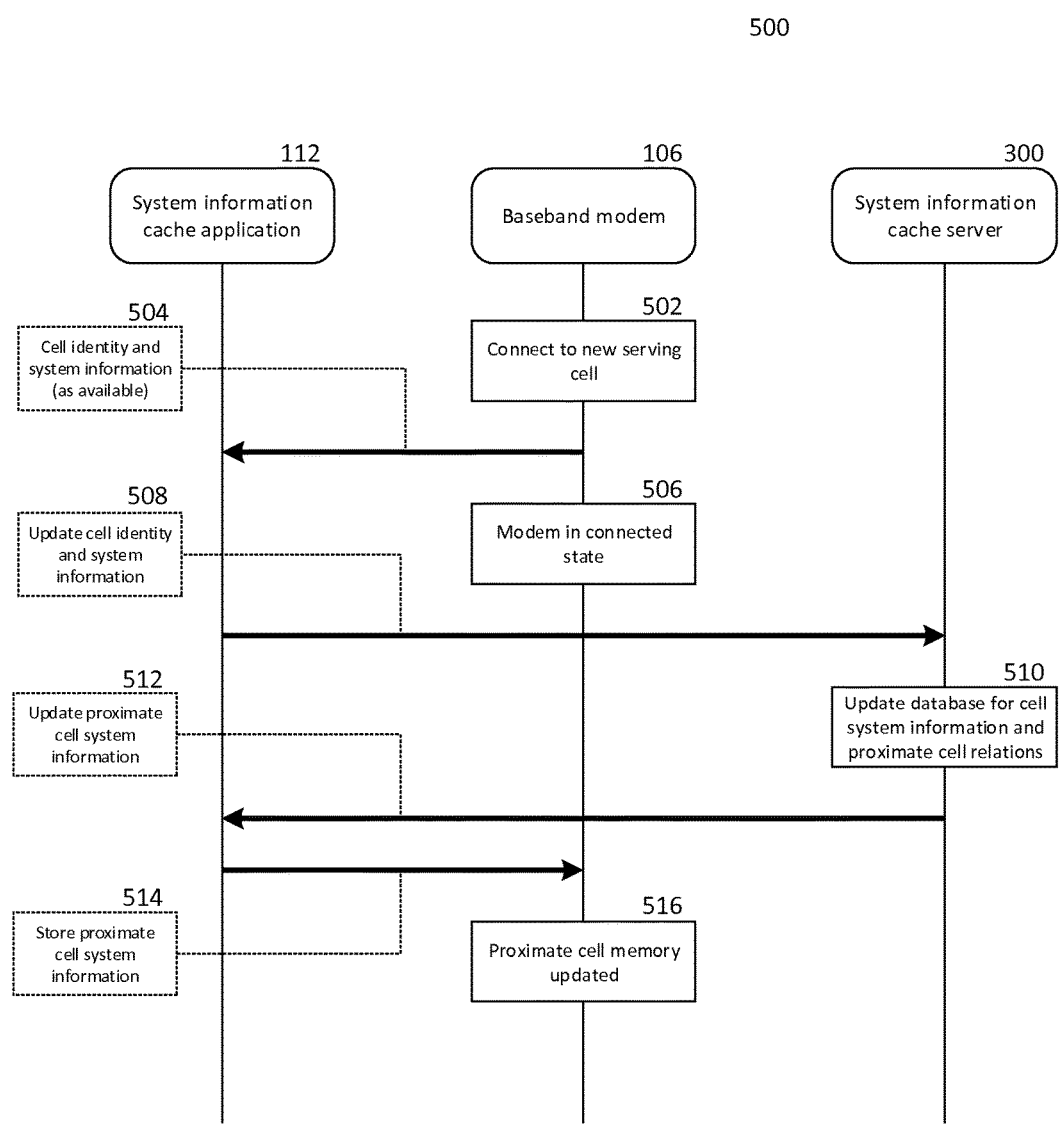
FIG. 5 shows a signal flow chart according to a first exemplary scenario.

FIG. 5 shows signal flow chart 500 further illustrating the operation of and interaction between mobile terminal 100 and SIB cache server 300. Signal flow chart 500 may be relevant in scenarios in which mobile terminal 100 has connected to a new serving cell.

In 502, baseband modem 106 may connect to a new serving cell, which for purposes of explanation may be located at e.g. base station 402. Accordingly, baseband modem 106 may read one or more system information messages of the new serving cell over the air interface, such as at least SIB1 (e.g. the primary system information message) and SIB2 in an LTE configuration. Baseband modem 106 may therefore obtain cell system information (cell global identity system information from SIB1 and further cell system information from SIB2 and any further read SIBs) for the new serving cell in addition to cell identity information for the serving cell obtained during connection to the serving cell, and may provide cell identity and system information for the serving cell to SIB cache application 112 at 504. Baseband modem 106 may provide at least the physical cell identity, RAT, and system frequency (cell identity information) in addition to system information (cell global identity system information from SIB1 including PLMN ID, Area Code, Cell ID and any further cell system information from other SIBs including paging information, power control information, multimedia (e.g. eMBMS) information, cell search/measurement parameters, etc.) obtained from the system information messages to SIB cache application 112. As previously indicated, baseband modem 106 may provide the further cell system information in encoded or decoded form.

Baseband modem 106 may have additionally performed cell search and/or cell measurements, and may have detected one or more neighbor cells of the current serving cell, which may be e.g. further cells of base station 402, cells of base stations 404 or 406, or cells of additional base stations not explicitly shown in FIG. 4. Baseband modem 106 may e.g. have performed cell search/measurement during the connection process to find a new serving cell (i.e. prior to 502), or may have performed cell search/measurement after connecting to the new serving cell at 502. Baseband modem 106 may thus have obtained cell identity information (physical cell identity, RAT, and system frequency) of one or more neighbor cells of the current serving cell. Baseband modem 106 may also have obtained measurement results of the one or more neighbor cells of the current serving cell. Baseband modem 106 may additionally provide the neighbor cell identity information to SIB cache application at 504 (or e.g. may have previously provided the neighbor cell identity information to SIB cache application 112).

For example, baseband modem 106 may have detected neighbor cells located at base stations 402-406 during cell search and/or measurement. Baseband modem 106 may therefore provide cell identity information (physical cell identity, RAT, and system frequency) to SIB cache application 112, which as will be detailed may be subsequently utilized by SIB cache server 300 to identify proximate cell relations for the current serving cell.

Optionally (not explicitly shown in FIG. 5), baseband modem 106 may read system information for one or more neighbor cells over the air interface, although this operation may be limited by due to the extended durations of time required to read system information over the air interface. Baseband modem 106 may similarly provide the neighbor cell system information to SIB cache application 112 at 504.

In 502-504, baseband modem 106 (and by extension mobile terminal 100) may be in an idle state, and accordingly SIB cache application 112 may not be able to immediately transmit the obtained cell identity and system information to SIB cache server 300. Baseband modem 106 may enter into a connected state at 506, and may accordingly be configured with uplink radio resources sufficient to transmit uplink data to mobile communication network 410, i.e. over air interface 412 to base station 402 in accordance with the current serving cell.

SIB cache application 112 may then perform a handshake operation with SIB cache server 300 at 508-512 in order to both provide SIB cache server 300 with newly obtained cell identity and system information and retrieve proximate cell system information for one or more proximate cells of the new serving cell. It is appreciated that the handshake operation with SIB cache server 300 may alternatively involve only a serving cell update by SIB cache application 112 and reception of system information for proximate cells at SIB cache application 112 from SIB cache server 300 (and accordingly no exchange of neighbor cell identity or system information).

SIB cache application 112 may at 508 provide SIB cache server 300 with the cell identity and system information obtained by baseband modem 106, e.g. the current serving cell identity and system information, neighbor cell identity information (if available), and neighbor cell system information (if available). For example, SIB cache application 112 may provide SIB cache server with the system information and cell identity information of the current serving cell at base station 402 in addition to the neighbor cell identity information and measurements of the one or more neighbor cells of base stations 402-406.

SIB cache server 300 may at 510 update database 300*b* based on the received cell identity and system information. SIB cache server 300 may contain a list of cell entries, where each cell entry specifies cell identity information (physical cell identity, RAT, and system frequency), a list of proximate cells to the cell of the cell entry, and system information (cell global identity system information and/or further cell system information including PLMN ID, Area Code, Cell ID, paging information, power control information, multimedia (e.g. eMBMS) information, cell search/measurement parameters, etc.), which may also correspond to a list of available system information for each cell entry, i.e. identifying which types of system information are available for each cell entry. SIB cache server 300 may create each cell entry upon receiving cell identity and system information for a given cell from a participating mobile terminal (via the baseband modem and SIB cache application of the participating mobile terminal) and may update each cell entry based on new relevant cell identity and/or system information.

If a cell entry exists for the current serving cell at database 300*b*, SIB cache server 300 may store the system information provided for the current serving cell at 508 with previously obtained cell identity and system information for the current serving cell. Alternatively, if no cell entry exists for the current serving cell at database 300b, SIB cache server 300 may create a new cell entry for the current serving cell using the cell identity and system information.

In order to create useful cell entries, SIB cache server 300 may create and update a proximate cell list for each cell entry, where the proximate cell list identifies proximate cells of the cell of the cell entry. For example, the proximate cell list may identify other cell entries corresponding to the identified proximate cells stored in database 300b. SIB cache server 300 may assign the proximate cell list for each cell entry based on cell identity information provided by participating mobile terminals.

For example, SIB cache server 300 may utilize the neighbor cell identity information provided by SIB cache application at 508 for the one or more cells of base stations 402-406 in order to update the proximate cell list for the serving cell entry in database 300b. As mobile terminal 100 has detected the one or more cells of base stations 402-406 as neighbor cells of the current serving cell during cell search and/or measurement, SIB cache server 300 may identify the one or more indicated neighbor cells as neighbor cells of the current serving cell. Accordingly, SIB cache server 300 may include the one or more indicated neighbor cells in the proximate cell list for the current serving cell entry in database 300b. If a cell entry already exists for the current serving cell, SIB cache server 300 may e.g. add any of the one or more neighbor cells provided at 508 to the proximate cell list for the current serving cell entry.

As previously indicated, the proximate cell list may refer to cell entries in database 300b each respectively corresponding to a proximate cell identified in the proximate cell list. For example, the current serving cell of mobile terminal 100 may be Cell1, of base station 402 as previously detailed. Baseband modem 106 and SIB cache application may have reported Cell5, Cell6, and Cell7 (each located at one of base stations 402-406, although such is purely exemplary) as neighbor cells of Cell1 based on cell search and/or measurement results.

Accordingly, SIB cache server 300 may ensure that Cell5, Cell6, and Cell7 are included in the proximate cell list for the Cell1 entry in database 300b. In addition to providing cell identity information for each of Cell5, Cell6, and Cell7, the proximate cell list for Cell1 may specify the location within database 300b of the Cell5, Cell6, and Cell7 entries. It is appreciated that the proximate cell list may alternatively specify only a memory location and/or index as opposed to explicitly identifying the proximate cells with cell identity information.

In addition, the proximate cell list for Cell1 may additionally contain Cell10 and Cell12, which may be located at one of base stations 402-406. SIB cache server 300 may have received previous information, e.g. from additional participating mobile terminals, that Cell10 and Cell12 are neighbor cells of Cell1.

Furthermore, database 300b may already contain cell entries with system information for each of Cell5, Cell7, and Cell12, where the location of the cell entries for Cell5, Cell7, and Cell12 are specified by the proximate cell list for Cell1. Additional participating mobile terminals may have provided the system information for Cell5, Cell7, and Cell12 at previous points in time in which the participating mobile terminals read the system information for Cell5, Cell7, or Cell12 over the air interface.

Accordingly, database 300b may retrieve any stored system information for Cell5, Cell7, and Cell12 from the respective cell entries at 510. SIB cache server 300 may then complete the handshake operation in 512 by providing SIB cache application 112 with the cell identity and system information for each of Cell5, Cell7, and Cell12.

SIB cache application 112 may receive the proximate cell system information for Cell5, Cell7, and Cell12 at 512, which are the proximate cells of current serving cell Cell1 as associated by SIB cache server 300 for which SIB cache server 300 has stored system information.

SIB cache application 112 may provide baseband modem 106 with the proximate cell system information (and cell identity information) at 514. Baseband modem 106 may store the proximate cell system information along with the cell identity information at 516, such as in non-volatile memory of baseband memory 106b.

Accordingly, baseband modem 106 may have locally stored system information for Cell5, Cell7, and Cell12, which were identified as proximate cells for the current serving cell Cell1. Therefore, if baseband modem 106 needs to access system information for one of Cell5, Cell7, and Cell12, such as by cell selection/reselection, handover, or CGI measurement reporting, baseband modem 106 may simply read the system information from baseband memory 106b as opposed to reading the system information over the air interface. Mobile terminal 106 may then provide a Radio Resource Control (RRC) layer of a protocol stack executed at digital processing circuit(s) 106a with the system information. Mobile terminal 100 may therefore save power in addition to performing faster acquisition of system information.

SIB cache server 300 may perform further analysis in order to identify the proximate cell list for each cell entry. Such procedures may be performed e.g. by processor 300a. In addition to identifying neighbor cells explicitly indicated by participating mobile terminals, SIB cache server 300 may also identify neighbor cells of neighbor cells, or further such relationships, as proximate cells of a given cell.

SIB cache server 300 may utilize further information in order to identify proximate cells of a given cell. For example, mobile terminal 100 may provide SIB cache server 300 with a geographic location, such as obtained via Global Positioning System (GPS), specifying a past or current location of mobile terminal 100. SIB cache server 300 may utilize this information in order to select proximate cells to mobile terminal 100, such as based on geographic locations, which may be previously provided by participating mobile terminals along with neighbor cell identity information or provided directly to SIB cache server 300, such as by programming known geographic locations of base stations into SIB cache server 300 by e.g. an operator. SIB cache server 300 may thus utilize this information in order to select proximate cells to mobile terminal 300.

Accordingly, SIB cache application 112 may be further configured to only provide SIB cache server 300 with a geographic location, or a geographic location in addition to the current serving cell. SIB cache server 300 may be configured to select proximate cells for which to provide system information to SIB cache application 112 based on the provided geographic location, current serving cell (if specified), and other previously obtained geographic information associated cell entries in SIB cache server 300.

SIB cache server 300 may be configured to select a certain amount of cells as proximate cells of a given cell. For example, SIB cache server 300 may be e.g. configured to select 5 cells, 10 cells, etc. to store in the proximate cell list for each cell entry. Alternatively, SIB cache server 300 may store more cells in the proximate cell list for a given cell and select a certain amount to provide to a participating mobile terminal. Such variations are additionally embraced herein.

SIB cache server 300 may also be configured to select a set of preferred proximate cells for a given cell from a larger set of proximate cells. For example, SIB cache server 300 may analyze measurement results stored in SIB cache server 300 and/or provided by mobile terminal 100 in order to select which cells to provide system information to mobile terminal 100 as proximate cells of the current serving cell. For example, mobile terminal 100 may have performed a cell search and detected cells Cell3, Cell5, and Cell8 while connected to Cell1 as a serving cell. SIB cache server 300 may have Cell3, Cell4, Cell5, and Cell8 as proximate cells for the current cell entry of Cell1. As mobile terminal 100 did not detect Cell4, SIB cache server 300 may provide system information only for Cell3, Cell5, and Cell8 (i.e. the detected cells) to mobile terminal 100 in 512. Many such similar variations are possible.

SIB cache server 300 may additionally analyze cell measurement results, e.g. signal power, signal quality, and/or signal strength, in a similar manner. SIB cache server 300 may also analyze measurements provided by other participating mobile terminals to identify which proximate cells for a given cell entry are consistently reported in conjunction with strong measurements. SIB cache server 300 may thus be weighted towards providing system information for proximate cells with strong measurements to a requesting mobile terminal as opposed to proximate cells with weak measurements.

Many different criteria for proximate cells may thus be provided. The exact criteria may be configurable, such as by a user of mobile terminal 100 operating SIB cache application 112. For example, the user may select a quantity of proximate cells for which to receive system information from SIB cache server 300 for any current serving cell, and/or may specify criteria such as cell detection and/or measurements results as indicated above.

As numerous mobile terminals may participate in providing SIB cache server 300 with cell identity and system information over time, validity measures may need to be implemented in order to ensure that system information has not expired before use. For example, in an LTE network configuration, system information retrieved from SIB blocks may be assumed valid if it is less than 3 hours old and the SystemInfoValueTag Information Element (IE) in SIB1 does not indicate a system information change. Validity measures may be implemented in SIB cache application 112, baseband modem 106, and/or SIB cache server 300 in order to ensure that retrieved system information is still valid before utilizing such retrieved system information as opposed to reading new system information over the air interface.

As previously indicated, baseband modem 106 may apply locally stored system information for proximate cells in the event that baseband modem 106 may need to acquire system information for one of the proximate cells. For example, after 516 in signal flow chart 500, baseband modem 106 may switch to a different serving cell than the new serving cell in 502, such as a result of handover or radio release into radio idle mode (resulting in cell selection). Accordingly, baseband modem 106 may need to read system information for the second serving cell, which may differ based on whether the switch was a result of handover or radio release.

Regardless, baseband modem 106 may need to read multiple system information messages from the second serving cell. In an LTE configuration, baseband modem 106 may need to read at least SIB1 and SIB2 if baseband modem 106 is connected to the second serving cell in radio idle mode and one or more additional SIBs if baseband modem 106 is connected to the second serving cell in radio connected mode.

As a result of the handshake procedure in 508-512 and local storage in 514-516, baseband modem 106 may already have the system information for the second serving cell locally stored, i.e. as SIB cache server 300 identified the second serving cell a proximate cell of the original serving cell in 510 and subsequently provided SIB cache application 112 with system information for the second serving cell. However, baseband modem 106 may be unsure if the locally stored system information for the second serving cell is still valid, as the system information may have changed. Accordingly, in an LTE configuration assuming baseband modem 106 received SIB1, SIB2, and optionally one or more further SIBs of the second serving cell from SIB cache server 300, baseband modem 106 may read SIB1 from the second serving cell over the air interface in order to read the SystemInfoValueTag IE from SIB1, which indicates whether system information has changed. Baseband modem 106 may compare the SystemInfoValueTag from the air interface-read SIB1 to the SystemInfoValueTag from the locally stored SIB1 of the second serving cell. If the SystemInfoValueTag IEs match, baseband modem 106 may determine that the system information has not changed, and may proceed to utilize information in locally stored SIB2 and any other further required locally stored SIBs as opposed to performing a fresh SIB reading over the air interface. However, if SystemInfoValueTag IEs do not match, baseband modem 106 may determine that the system information has changed, and accordingly the locally stored system information is invalid.

In certain cases, such as CGI reporting, the serving cell may instruct baseband modem 106 to identify the global identity, i.e. CGI, of a target cell. In accordance with an LTE configuration, baseband modem 106 may need the Cell ID, PLMN ID, and Tracking Area Code (TAC) provided in SIB1 (i.e. cell global identity system information) in order to determine the CGI of a target cell. Accordingly, performing such a validity check may not be useful, as baseband modem 106 may need to perform a fresh air interface read of SIB1 in order to perform the validity check, thereby obtaining the required information to identify the CGI of a target cell. However, SIB1 information, in particular Cell ID, PLMN ID, and TAC, may be substantially static and change very infrequently. Accordingly, while system information contained in other SIBs may change more frequently, in many cases it may be acceptable to assume that SIB1 information is static. Accordingly, in the case of CGI reporting baseband modem 106 may simply utilize a locally stored SIB1 for a CGI target cell without performing any validity check. Alternatively, baseband modem 106 may perform a validity check entirely based on time, such as by utilizing a timestamp associated with the locally stored SIB1 for the CGI target cell to evaluate whether the locally stored SIB1 is likely valid or invalid.

Further scenarios involving only reading of SIB1, such as for determining if a given cell is reserved or barred to evaluate suitability of a cell for connection, may utilize a similar procedure as detailed above regarding CGI reporting.

Timestamps may thus be utilized in addition to the aforementioned 3 hour time window and SystemInfoValueTag. For example, SIB cache server 300 may assign a timestamp to system information stored in database 300b, and may periodically remove system information with timestamps that are sufficiently old. Alternatively, SIB cache server 300 may evaluate system information before transmitting the system information to a requesting SIB cache application in order to determine whether the system information has expired based on an attached timestamp.

Signal flow chart 500 may also be relevant in scenarios in which system information of the current serving cell of mobile terminal 100 has changed, e.g. similarly to as introduced above regarding SystemInfoValueTag in SIB1 for an LTE configuration.

For example, as opposed to connecting to a new serving cell in 502, baseband modem 106 may read SIB1 over the air interface from the current serving cell. Baseband modem 106 may determine that the SystemInfoValueTag in SIB1 has changed, thus signaling that system information in one or more SIBs has changed. Accordingly, baseband modem 106 may read one or more further SIBs and provide the system information to SIB cache application at 504. Upon entering connected state in 506, SIB cache application 112 may provide the new system information for the current serving cell to SIB cache server 300 in 508. SIB cache server 300 may then update the cell entry for the current serving cell in database 300b. Accordingly, other participating mobile terminals requesting system information for the current serving cell (by way of proximate cell associations) may receive updated system information for the current serving cell.

Accordingly, handshake operations between SIB cache application 112 and SIB cache server 300 may occur in connected state (relative to baseband modem 106) after a baseband modem 106 connects to a new serving cell and/or after a system information change for a current serving cell. It is noted that baseband modem 106 may connect to a new serving cell during either idle state or connected state, such as for cell selection/reselection or handover, respectively. Baseband modem 106 may in both aforementioned scenarios read system information from the new serving cell and provide the system information to SIB cache application 112 for transmission to SIB cache server 300.

In addition to ensuring SIB cache server 300 has updated system information, it may be important for SIB cache application 112 to perform handshakes following new serving cell connections in order to ensure that baseband modem 106 has system information for relevant proximate cells to the new serving cell locally stored in baseband memory 106b. As SIB cache server 300 may have a different proximate cell list for each cell in database 300b, SIB cache application 112 may perform handshakes with SIB cache server 300 after each new serving cell connection in order to obtain system information for the most relevant proximate cells to the new serving cell to provide to baseband modem 106 for local storage. Such may result in a higher probability that any target cells identified by baseband modem 106 for system information acquisition (i.e. following cell selection/reselection, handover, or CGI reporting) correspond to locally stored system information at baseband modem 106, thus avoiding the need for fresh air interface system information reading.

SIB cache application 112 may additionally periodically perform handshakes with SIB cache server 300 when baseband modem 106 is in radio connected mode and/or mobile terminal 100 has an active secondary network connection (e.g. WiFi). For example, SIB cache application 112 may perform handshakes with SIB cache server 300 in order to retrieve updated system information for any proximate cells of the current serving cell of baseband modem 106. Additionally, SIB cache application 112 may perform handshakes with SIB cache server 300 in order to receive system information from SIB cache server 300 for any proximate cells that have been newly associated with the current serving cell, such as cells that have been added to the proximate cell list for the current serving cell entry since the last handshake. Such may ensure current system information for proximate cells is locally stored at baseband modem 106.

It is appreciated that system information for proximate cells may be locally stored at non-volatile memory of baseband memory 106b, thus ensuring that the proximate cell system information is available following a power-down scenario.

Figure 6:
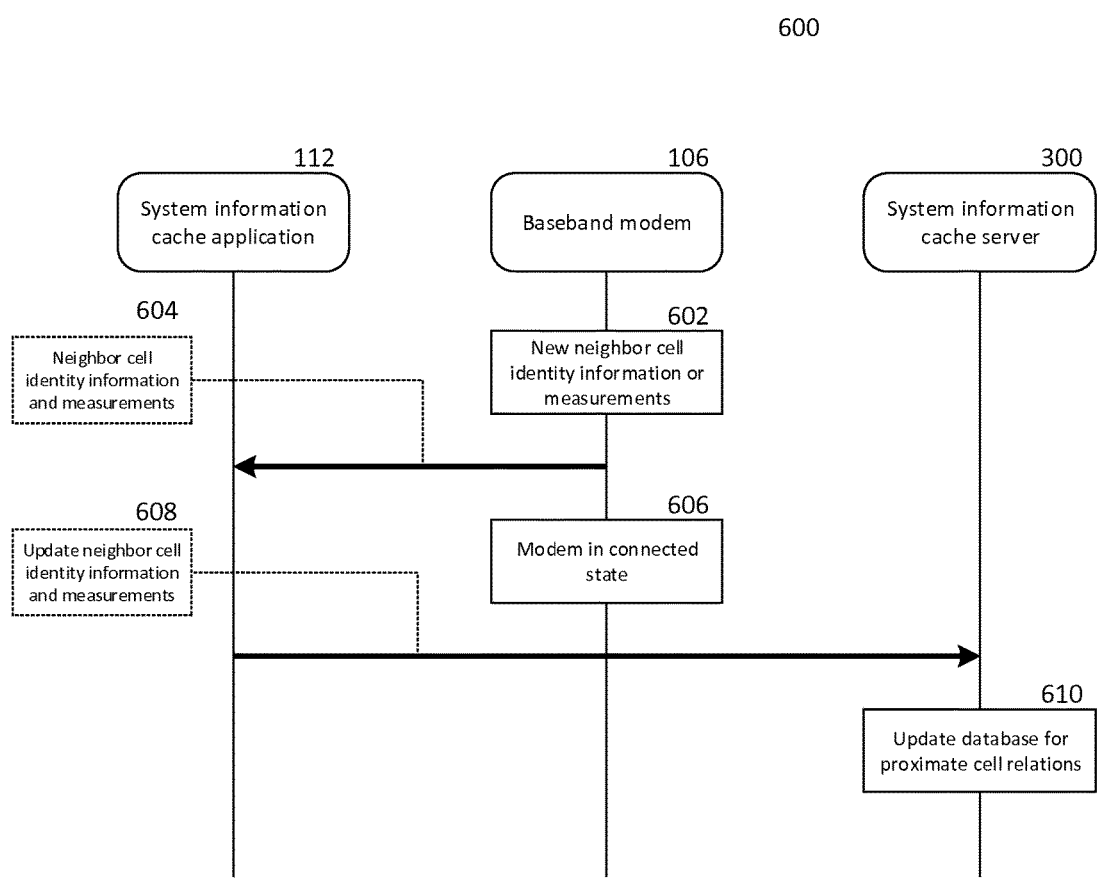
FIG. 6 shows a signal flow chart according to a second exemplary scenario.

FIG. 6 shows signal flow chart 600 further illustrating the operation of and interaction between mobile terminal 100 and SIB cache server 300. Signal flow chart 600 may be relevant in scenarios in which mobile terminal 100 has obtained new neighbor cell identity information (and/or system information, if available).

Baseband modem 106 may obtain new neighbor cell identity information and/or measurements in 602. For example, baseband modem 106 may perform cell measurements, a cell search, a PLMN search, etc., and accordingly detect one or more neighbor cells for the current serving cell of baseband modem 106. Baseband modem 106 may execute 602 as part of standard procedures, or e.g. may explicitly trigger 602 in order to obtain neighbor cell identity and/or measurements for the purpose of updating SIB cache server 300. Although not explicitly shown in FIG. 6, baseband modem 106 may optionally in addition read system information for one or more neighbor cells over the air interface in order to provide the system information to SIB cache server 300.

Baseband modem 106 may provide the obtained neighbor cell identity information and measurements (and cell system information, if available) to SIB cache application 112 in 604. However, baseband modem 106 may be in an idle state following 604, and accordingly SIB cache application 112 may not be able to perform a handshake with SIB cache server 300. In 606, baseband modem 106 may enter a connected state, and accordingly may be configured with uplink radio resources to transmit uplink data. SIB cache application 112 may accordingly perform a handshake with SIB cache server 300. SIB cache application 112 may provide the neighbor cell identity information and measurements (and cell system information, if available) to SIB cache server 300 in 608. SIB cache server 300 may utilize the neighbor cell identity information and measurements to update the proximate cell list for the current serving cell of baseband modem 106 in database 300b based on the received neighbor cell identity information and measurements in 610. Additionally, SIB cache server 300 may update system information for the one or more neighbor cell entries if system information was provided by SIB cache application 112 for any of the neighbor cells.

As previously detailed, SIB cache server 300 may contain at database 300b a list of cell entries, where each cell entry corresponds to cell identity information, system information (cell global identity system information (PLMN ID, Area Code, Cell ID) and optionally further cell system information), a list of available system information, such as e.g. stored specific SIBs, and a proximate cell list. In order to effectively store the system information for a given cell, SIB cache server 300 may store the system information in encoded form, i.e. as a baseband or intermediate frequency signal before decoding and demodulation is performed. Accordingly, baseband modem 106 may provide, via SIB cache application 112, entire system information messages in encoded form to SIB cache server 300 during handshake operations. Similarly, SIB cache server 300 may provide, via SIB cache application 112, entire system information messages in encoded form to baseband modem 106. Upon determining the need to utilize locally stored system information, baseband modem 106 may decode the encoded system information in order to acquire specific system information parameters contained therein.

Alternately, SIB cache server 300 may store system information in decoded form, such as by receiving system information messages from baseband modem 106 in decoded form.

The above disclosure details interactions between baseband modem 106 and SIB cache application 112 executed on application processor 108. Such interaction may be facilitated through the use of Attention (AT) commands, such as AT commands to trigger a neighbor cell search at baseband modem 106, AT commands to retrieve all detected neighbor cells from baseband modem 106, AT commands to retrieve SIBs of a serving cell from baseband modem 106, AT commands to update SIB cache in non-volatile memory of baseband memory 106b, etc.

Figure 7:
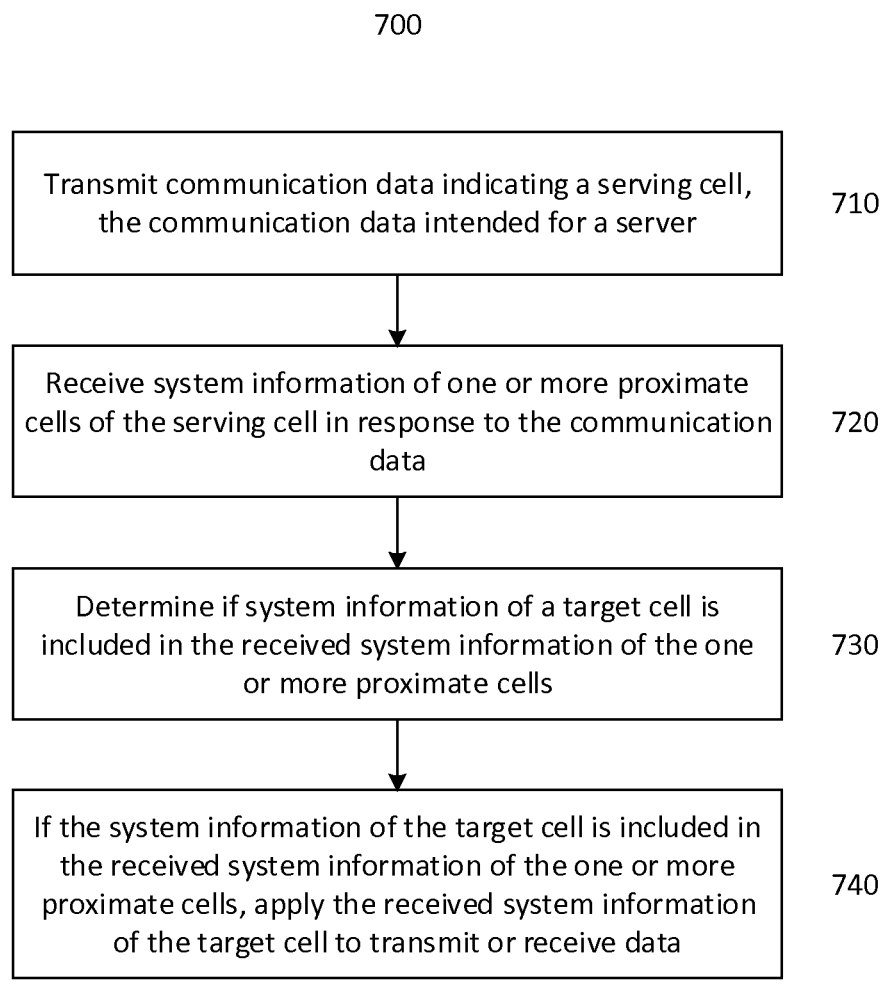
FIG. 7 shows a method for performing wireless communications according to a first aspect of the disclosure.

FIG. 7 shows a flow chart illustrating method 700 for performing wireless communications. In 710, method 700 may transmit communication data indicating a serving cell, the communication data intended for a server. In 720, method 700 may receive system information of one or more proximate cells of the serving cell in response to the communication data. Method 700 may then determine if system information of a target cell is included in the received system information of the one or more proximate cells in 730. In 740, if the system information of the target cell is included in the received system information of the one or more proximate cells, method 700 may apply the received system information of the target cell to transmit or receive wireless data.

In one or more further exemplary aspects of the disclosure, one or more of the features described above in reference to FIGS. 1-6 may be further incorporated into method 700. In particular, method 700 may be configured to perform further and/or alternate processes as detailed regarding mobile terminal 100.

Figure 8:
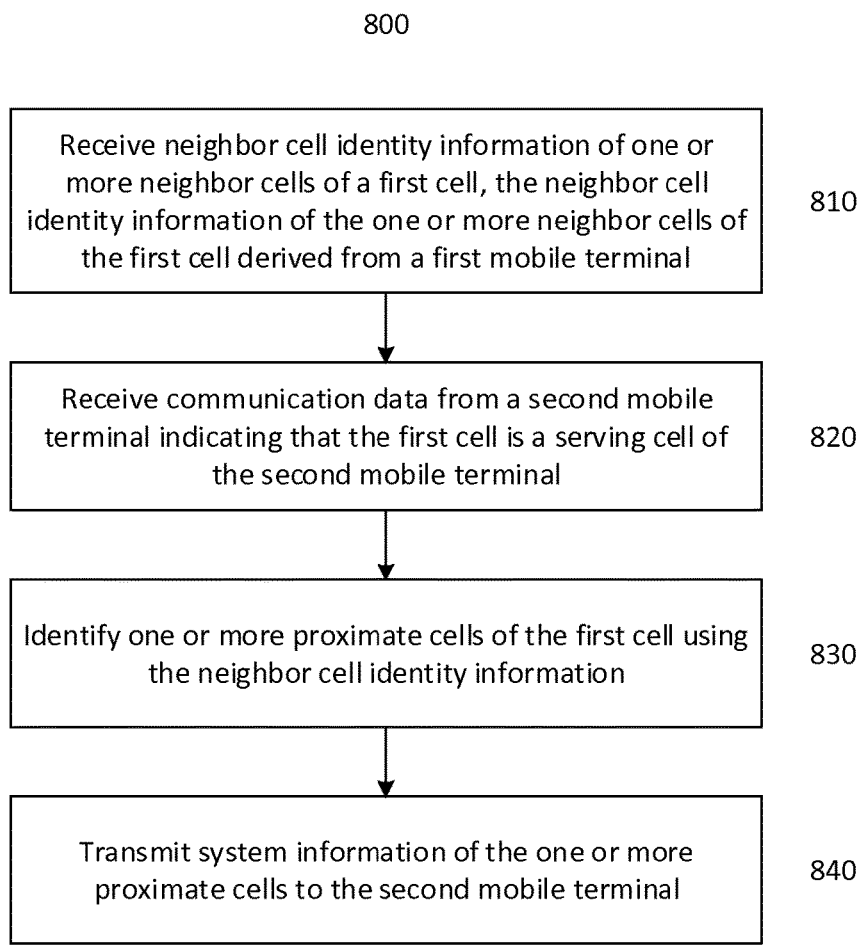
FIG. 8 shows a method for performing wireless communications according to a second aspect of the disclosure.

FIG. 8 shows a flow chart illustrating method 800 for performing wireless communications. In 810, method 800 may receive neighbor cell identity information of one or more neighbor cells of a first cell, the neighbor cell identity information of the one or more neighbor cells of the first cell derived from a first mobile terminal. Method 800 may then receive communication data from a second mobile terminal indicating that the first cell is a serving cell of the second mobile terminal in 820. Method 800 may then identify one or more proximate cells of the first cell using the neighbor cell identity information in 830. In 840, method 800 may transmit system information of the one or more proximate cells to the second mobile terminal.

In one or more further exemplary aspects of the disclosure, one or more of the features described above in reference to FIGS. 1-6 may be further incorporated into method 800. In particular, method 800 may be configured to perform further and/or alternate processes as detailed regarding SIB cache server 300.

FIG. 9 shows a flow chart illustrating method 900 for performing wireless communications between a first mobile terminal and a server. Method 900 may in 910 receive, at the server, first communication data comprising neighbor cell identity information for one or more neighbor cells of a first cell from a second mobile terminal. In 920, method 900 may receive, at the server, second communication data from the first mobile terminal indicating that the first cell is a serving cell of the first mobile terminal. Method 900 may then identify, at the server, one or more proximate cell of the first cell using the neighbor cell identity information in 930. In 940, method 900 may receive, at the server, one or more proximate cell of the first cell using the neighbor cell identity information. In 950, method 900 may determine, at the first mobile terminal, if system information of a target cell is included in the received system information of the one or more proximate cells. If the system information of the target cell is included in the received system information of the one or more proximate cells, method 900 may apply the received system information of the target cell at the first mobile terminal to transmit or receive wireless data in 960.

In one or more further exemplary aspects of the disclosure, one or more of the features described above in reference to FIGS. 1-6 may be further incorporated into method 900. In particular, method 900 may be configured to perform further and/or alternate processes as detailed regarding mobile terminal 100 and/or SIB cache server 300.

The following examples pertain to further aspects of the disclosure:

Example 1 is a method in a mobile terminal for performing wireless communications. The method includes transmitting communication data indicating a serving cell, the communication data intended for a server, receiving system information of one or more proximate cells of the serving cell in response to the communication data, determining if system information of a target cell is included in the received system information of the one or more proximate cells, and if the system information of the target cell is included in the received system information of the one or more proximate cells, applying the received system information of the target cell in the mobile device to transmit or receive data.

In Example 2, the subject matter of Example 1 can optionally include further including if the system information of the target cell is not included in the received system information of the one or more proximate cells, receiving the system information of the target cell from the target cell.

In Example 3, the subject matter of Example 1 or 2 can optionally include further including storing the system information of the one or more proximate cells of the serving cell in a memory.

In Example 4, the subject matter of Example 3 can optionally include further including if the system information of the target cell is included in the received system information of the one or more proximate cells, retrieving the received system information of the target cell from the memory.

In Example 5, the subject matter of any one of Examples 1 to 4 can optionally include further including if the system information of the target cell is included in the received system information of the one or more proximate cells, determining whether the received system information of the target cell is valid, and wherein the applying the received system information of the target cell to transmit or receive data includes applying the received system information of the target cell to transmit or receive data if the received system information of the target cell is valid.

In Example 6, the subject matter of Example 5 can optionally include wherein the determining whether the received system information of the target cell is valid includes determining if a validity tag included in a first system information message of the target cell matches with a validity tag included in a second system information message of the target cell, the first system information message being included in the received system information of the one or more proximate cells.

In Example 7, the subject matter of Example 6 can optionally include further including receiving the second system information message from the target cell.

In Example 8, the subject matter of Example 6 or 7 can optionally include wherein the first system information message of the target cell and the second system information message of the target cell are the same system information message type.

In Example 9, the subject matter of any one of Examples 6 to 8 can optionally include wherein the first system information message of the target cell and the second system information message of the target cell are System Information Block Type 1 (SIB1) in accordance with a Long Term Evolution (LTE) network.

In Example 10, the subject matter of any one of Examples 6 to 8 can optionally include wherein the first system information message of the target cell and the second system information message of the target cell are Master Information Blocks (MIB) in accordance with a Universal Mobile Telecommunications System (UMTS) network In Example 11, the subject matter of any one of Examples 6 to 10 can optionally include wherein the applying the received system information of the target cell to transmit or receive data if the received system information of the target cell is valid includes applying a third system information message of the target cell included in the received system information of the one or more proximate cells to transmit or receive data if the received system information of the target cell is valid.

In Example 12, the subject matter of any one of Examples 1 to 11 can optionally include wherein the transmitting communication data indicating a serving cell includes transmitting communication data including cell identity information of the serving cell.

In Example 13, the subject matter of any one of Examples 1 to 12 can optionally include wherein the applying the received system information of the target cell to transmit or receive data includes utilizing the received system information of the target cell to transmit or receive data with the target cell.

In Example 14, the subject matter of Example 13 can optionally include further including establishing a wireless connection with the target cell, and wherein the utilizing the received system information of the target cell to transmit or receive wireless data with the target cell includes utilizing the received system information of the target cell to transmit or receive wireless data with the target cell after establishing a connection with the target cell.

In Example 15, the subject matter of Example 14 can optionally include wherein the establishing a wireless connection with the target cell includes performing cell selection or reselection from the serving cell to the target cell.

In Example 16, the subject matter of Example 14 can optionally include wherein the establishing a wireless connection with the target cell includes performing handover from the serving cell to the target cell.

In Example 17, the subject matter of any one of Examples 1 to 12 can optionally include wherein the applying the received system information of the target cell to transmit or receive data includes identifying cell identity information of the target cell using the received system information of the target cell, and transmitting a reporting message to the serving cell including the cell identity information of the target cell.

In Example 18, the subject matter of any one of Examples 1 to 18 can optionally include wherein the transmitting communication data indicating a serving cell includes transmitting the communication data including geographical location information.

In Example 19, the subject matter of any one of Examples 1 to 12 can optionally include wherein the applying the received system information of the target cell to transmit or receive data includes transmitting a reporting message intended for the serving cell including cell identity information of the target cell.

In Example 20, the subject matter of Example 19 can optionally include wherein the applying the received system information of the target cell to transmit or receive data further includes identifying the cell identity information of the target cell using the received system information of the target cell, and wherein the transmitting a reporting message intended for the serving cell including cell information of the target cell includes transmitting the reporting message intended for the serving cell including the cell identity information of the target cell.

In Example 21, the subject matter of Example 20 can optionally include wherein the reporting message is a Cell Global Identification (CGI) reporting message.

In Example 22, the subject matter of Example 20 or 21 can optionally include wherein the system information of the target cell includes information of a System Information Block Type 1 (SIB1) of the target cell according to a Long Term Evolution (LTE) network configuration.

In Example 23, the subject matter of any one of Examples 1 to 22 can optionally include further including transmitting additional communication data including system information of the serving cell.

In Example 24, the subject matter of Example 23 can optionally include wherein the additional communication data further includes cell identity information of the serving cell.

In Example 25, the subject matter of any one of Examples 1 to 22 can optionally include further including receiving system information of the serving cell from the serving cell, and transmitting first additional communication data including the received system information of the serving cell to the server.

In Example 26, the subject matter of Example 25 can optionally include further including transmitting second additional communication data including cell identity information of one or more neighbor cells of the serving cell.

In Example 27, the subject matter of Example 25 can optionally include wherein the first additional communication data further includes cell identity information of the serving cell.

In Example 28, the subject matter of any one of Examples 1 to 22 can optionally include further including transmitting additional communication data including cell identity information of the serving cell.

In Example 29, the subject matter of any one of Examples 1 to 25 can optionally include further including transmitting additional communication data including cell identity information of one or more neighbor cells of the serving cell, the communication data intended for the server.

In Example 30, the subject matter of any one of Examples 1 to 25 can optionally include further including performing cell search or cell measurement in order to detect one or more neighbor cells of the serving cell, and transmitting additional communication data including cell identity information of the one or more neighbor cells, the communication data intended for the server.

In Example 31, the subject matter of Example 30 can optionally include wherein the additional communication data further includes cell measurement information of the one or more neighbor cells.

Example 32 is a method in a mobile terminal for performing wireless communications including receiving neighbor cell identity information of one or more neighbor cells of a first cell, the neighbor cell identity information of the one or more neighbor cells of the first cell derived from a first mobile terminal, receiving communication data from a second mobile terminal indicating that the first cell is a serving cell of the second mobile terminal, identifying one or more proximate cells of the first cell using the neighbor cell identity information, and transmitting system information of the one or more proximate cells to the second mobile terminal.

In Example 33, the subject matter of Example 32 can optionally include further including receiving system information of a first proximate cell of the one or more proximate cells of the first cell, the received system information derived from a third mobile terminal, and wherein the received system information of the one or more proximate cells of the first cell includes the received system information of the first proximate cell of the one or more proximate cells.

In Example 34, the subject matter of Example 33 can optionally include wherein the second mobile terminal is the third mobile terminal.

In Example 35, the subject matter of Example 34 can optionally include wherein the second mobile terminal is not the third mobile terminal.

In Example 36, the subject matter of Example 33 can optionally include further including receiving system information of a second proximate cell of the one or more proximate cells, the system information of the second proximate cell of the one or more proximate cells derived from a fourth mobile terminal.

In Example 37, the subject matter of Example 36 can optionally include wherein the received system information of the one or more proximate cells of the first cell includes the received system information of the second proximate cell of the one or more proximate cells.

In Example 38, the subject matter of any one of Examples 32 to 37 can optionally include wherein the identifying one or more proximate cells of the first cell using the neighbor cell identity information includes selecting the one or more neighbor cells of the first cell as included in the one or more proximate cells of the first cell.

In Example 39, the subject matter of any one of Examples 32 to 38 can optionally include further including receiving neighbor cell identity information of one or more additional neighbor cells of the first cell from a third mobile terminal, and updating a proximate cell list for the first cell based on the neighbor cell identity information of the one or more additional neighbor cells.

In Example 40, the subject matter of Example 39 can optionally include further including receiving neighbor cell measurement information of one or more further neighbor cells of the first cell from a third mobile terminal, and updating the proximate cell list for the first cell based on the neighbor cell measurement information of the one or more further neighbor cells.

In Example 41, the subject matter of Example 39 can optionally include wherein the identifying one or more proximate cells of the first cell using the neighbor cell identity information includes identifying the one or more proximate cells of the first cell using the proximate cell list.

In Example 42, the subject matter of Example 32 can optionally include further including receiving neighbor cell measurement information of one or more additional neighbor cells of the first cell from a third mobile terminal, and wherein the identifying one or more proximate cells of the first cell using the neighbor cell identity information includes identifying the one or more proximate cells of the first cell using the neighbor cell measurement information.

In Example 43, the subject matter of any one of Examples 32 to 42 can optionally include further including storing the neighbor cell identity information of the one or more neighbor cells in a memory.

In Example 44, the subject matter of any one of Examples 32 to 43 can optionally include further including retrieving the received system information of the one or more proximate cells from a memory.

In Example 45, the subject matter of Example 44 can optionally include further including receiving the system information of the one or more proximate cells from a third mobile terminal.

In Example 46, the subject matter of any one of Examples 32 to 45 can optionally include further including storing the received system information of the one or more proximate cells in a memory in encoded form.

Example 47 is a mobile terminal device having a radio processing circuit and a baseband processing circuit adapted to interact with the radio processing circuit, the mobile terminal device configured to transmit communication data indicating a serving cell, the communication data intended for a server, receive system information of one or more proximate cells of the serving cell in response to the communication data, determine if system information of a target cell is included in the received system information of the one or more proximate cells, and if the system information of the target cell is included in the received system information of the one or more proximate cells, applying the received system information of the target cell to transmit or receive data.

In Example 48, the subject matter of Example 47 can optionally be further configured to if the system information of the target cell is not included in the received system information of the one or more proximate cells, receive the system information of the target cell from the target cell.

In Example 49, the subject matter of Example 47 or 48 can optionally include further including a memory, wherein the mobile terminal device is further configured to store the received system information of the one or more proximate cells of the serving cell in a memory.

In Example 50, the subject matter of Example 49 can optionally be further configured to if the system information of the target cell is included in the received system information of the one or more proximate cells, retrieving the received system information of the target cell from the memory.

In Example 51, the subject matter of any one of Examples 47 to 50 can optionally be further configured to if the system information of the target cell is included in the received system information of the one or more proximate cells, determine whether the received system information of the target cell is valid, and wherein the applying the received system information of the target cell to transmit or receive data includes applying the system information of the target cell to transmit or receive data if the received system information of the target cell is valid.

In Example 52, the subject matter of Example 51 can optionally include wherein the determining whether the received system information of the target cell is valid includes determining if a validity tag included in a first system information message of the target cell matches with a validity tag included in a second system information message of the target cell, the first system information message being included in the received system information of the one or more proximate cells.

In Example 53, the subject matter of Example 52 can optionally be further configured to receive the second system information message from the target cell.

In Example 54, the subject matter of Example 52 or 53 can optionally include wherein the first system information message of the target cell and the second system information message of the target cell are the same system information message type.

In Example 55, the subject matter of any one of Examples 52 to 54 can optionally include wherein the first system information message of the target cell and the second system information message of the target cell are System Information Block Type 1 (SIB1) in accordance with a Long Term Evolution (LTE) network.

In Example 56, the subject matter of any one of Examples 52 to 54 can optionally include wherein the first system information message of the target cell and the second system information message of the target cell are Master Information Blocks (MIB) in accordance with a Universal Mobile Telecommunications System (UMTS) network.

In Example 57, the subject matter of any one of Examples 52 to 56 can optionally include wherein the applying the received system information of the target cell to transmit or receive data if the received system information of the target cell is valid includes applying a third system information message of the target cell included in the received system information of the one or more proximate cells to transmit or receive data if the received system information of the target cell is valid.

In Example 58, the subject matter of any one of Examples 47 to 57 can optionally include wherein the transmitting communication data indicating a serving cell includes transmitting communication data including cell identity information of the serving cell.

In Example 59, the subject matter of any one of Examples 47 to 57 can optionally include wherein the applying the received system information of the target cell to transmit or receive data includes utilizing the received system information of the target cell to transmit or receive data with the target cell.

In Example 60, the subject matter of Example 59 can optionally be further configured to establish a wireless connection with the target cell, and wherein utilizing the received system information of the target cell to transmit or receive data with the target cell includes utilizing the received system information of the target cell to transmit or receive data with the target cell after establishing a connection with the target cell.

In Example 61, the subject matter of Example 60 can optionally include wherein the establishing a wireless connection with the target cell includes performing cell selection or reselection from the serving cell to the target cell.

In Example 62, the subject matter of Example 60 can optionally include wherein the establishing a wireless connection with the target cell includes performing handover from the serving cell to the target cell.

In Example 63, the subject matter of any one of Examples 47 to 58 can optionally include wherein the applying the received system information of the target cell to transmit or receive data includes identifying cell identity information of the target cell using the received system information of the target cell, and transmitting a reporting message including the cell identity information of the target cell intended for the serving cell.

In Example 64, the subject matter of any one of Examples 47 to 63 can optionally include wherein the transmitting communication data indicating a serving cell by transmitting the communication data including geographical location information.

In Example 65, the subject matter of Example 47 can optionally include wherein the applying the received system information of the target cell to transmit or receive data includes transmitting a reporting message including cell information of the target cell intended for the serving cell.

In Example 66, the subject matter of Example 65 can optionally include wherein the applying the received system information of the target cell to transmit or receive data further includes identifying cell identity information of the target cell using the received system information of the target cell, and wherein the transmitting a reporting message including cell information of the target cell intended the serving cell includes transmitting the reporting message including the cell identity information of the target cell intended for the serving cell.

In Example 67, the subject matter of Example 66 can optionally include wherein the reporting message is a Cell Global Identification (CGI) reporting message.

In Example 68, the subject matter of Example 66 or 67 can optionally include wherein the system information of the target cell includes information of a System Information Block Type 1 (SIB1) of the target cell according to a Long Term Evolution (LTE) network configuration.

In Example 69, the subject matter of any one of Examples 47 to 68 can optionally be further configured to transmit additional communication data including system information of the serving cell.

In Example 70, the subject matter of Example 69 can optionally include wherein the additional communication data further includes cell identity information of the serving cell.

In Example 71, the subject matter of any one of Examples 47 to 68 can optionally be further configured to receive system information of the serving cell from the serving cell, and transmit first additional communication data including the received system information of the serving cell to the server.

In Example 72, the subject matter of Example 71 can optionally be further configured to transmit second additional communication data including cell identity information of one or more neighbor cells of the serving cell.

In Example 73, the subject matter of Example 71 can optionally include wherein the first additional communication data further includes cell identity information of the serving cell.

In Example 74, the subject matter of any one of Examples 47 to 68 can optionally be further configured to transmit additional communication data including cell identity information of the serving cell.

In Example 75, the subject matter of any one of Examples 47 to 71 can optionally be further configured to transmit additional communication data including cell identity information of one or more neighbor cells of the serving cell, the communication data intended for the server.

In Example 76, the subject matter of any one of Examples 47 to 71 can optionally be further configured to perform cell search or cell measurement in order to detect one or more neighbor cells of the serving cell, and transmit additional communication data including cell identity information of the one or more neighbor cells, the communication data intended for the server.

In Example 77, the subject matter of Example 76 can optionally include wherein the additional communication data further includes cell measurement information of the one or more neighbor cells.

Example 78 is a server having a memory and a processor adapted to perform processing on stored data. The server is configured to receive neighbor cell identity information of one or more neighbor cells of a first cell, the neighbor cell identity information derived from a first mobile terminal, receive communication data indicating that the first cell is a serving cell of a second mobile terminal, the communication data derived from the second mobile terminal, identify one or more proximate cells of the first cell using the neighbor cell identity information, and transmit system information of the one or more proximate cells to the second mobile terminal.

In Example 79, the subject matter of Example 78 can optionally be further configured to receive system information of a first proximate cell of the one or more proximate cells of the first cell, the received system information of the first proximate cell of the one or more proximate cells derived from a third mobile terminal, wherein the received system information of the one or more proximate cells of the first cell includes the received system information of the first proximate cell of the one or more proximate cells.

In Example 80, the subject matter of Example 79 can optionally include wherein the second mobile terminal is the third mobile terminal.

In Example 81, the subject matter of Example 80 can optionally include wherein the second mobile terminal is not the third mobile terminal.

In Example 82, the subject matter of Example 79 can optionally be further configured to receive system information of a second proximate cell of the one or more proximate cells, the received system information of the second proximate cell of the one or more proximate cells derived from a fourth mobile terminal.

In Example 83, the subject matter of Example 82 can optionally include wherein the received system information of the one or more proximate cells of the first cell includes the received system information of the second proximate cell of the one or more proximate cells.

In Example 84, the subject matter of any one of Examples 78 to 83 can optionally include wherein the identifying one or more proximate cells of the first cell using the neighbor cell identity information includes selecting the one or more neighbor cells of the first cell as included in the one or more proximate cells of the first cell.

In Example 85, the subject matter of any one of Examples 78 to 84 can optionally be further configured to receive neighbor cell identity information of one or more additional neighbor cells of the first cell from a third mobile terminal, and update a proximate cell list for the first cell based on the neighbor cell identity information of the one or more additional neighbor cells.

In Example 86, the subject matter of Example 85 can optionally be further configured to receive neighbor cell measurement information of one or more further neighbor cells of the first cell from a third mobile terminal, and update the proximate cell list for the first cell based on the neighbor cell measurement information of the one or more further neighbor cells.

In Example 87, the subject matter of Example 85 can optionally include wherein the identifying one or more proximate cells of the first cell using the neighbor cell identity information includes identifying the one or more proximate cells of the first cell using the proximate cell list.

In Example 88, the subject matter of Example 78 can optionally be further configured to receive neighbor cell measurement information of one or more additional neighbor cells of the first cell from a third mobile terminal, and wherein the identifying one or more proximate cells of the first cell using the neighbor cell identity information includes identifying the one or more proximate cells of the first cell using the neighbor cell measurement information.

In Example 89, the subject matter of any one of Examples 78 to 88 can optionally be further configured to store the neighbor cell identity information of the one or more neighbor cells in the memory.

In Example 90, the subject matter of any one of Examples 78 to 89 can optionally be further configured to retrieve the received system information of the one or more proximate cells from the memory.

In Example 91, the subject matter of Example 90 can optionally be further configured to receive the system information of the one more proximate cells from a third mobile terminal.

In Example 92, the subject matter of any one of Examples 78 to 91 can optionally be further configured to store the received system information of the one or more proximate cells in a memory in encoded form.

Example 93 is a method for performing wireless communications between a first mobile terminal and a server. The method includes receiving, at the server, first communication data including neighbor cell identity information for one or more neighbor cells of a first cell from a second mobile terminal, receiving, at the server, second communication data from the first mobile terminal indicating that the first cell is a serving cell of the first mobile terminal, identifying, at the server, one or more proximate cell of the first cell using the neighbor cell identity information, receiving, at the first mobile terminal, system information of the one or more proximate cells from the server, determining, at the first mobile terminal, if system information of a target cell is included in the received system information of the one or more proximate cells, and if the system information of the target cell is included in the received system information of the one or more proximate cells, applying the received system information of the target cell at the first mobile terminal to transmit or receive data.

In Example 94, the subject matter of Example 93 can optionally include further including if the system information of the target cell is not included in the received system information of the one or more proximate cells, receiving the system information of the target cell at the first mobile terminal from the target cell.

In Example 95, the subject matter of Example 93 or 94 can optionally include further including storing the system information of the one or more proximate cells of the serving cell in a memory at the first mobile terminal.

In Example 96, the subject matter of Example 95 can optionally include further including if the system information of the target cell is included in the received system information of the one or more proximate cells, retrieving the received system information of the target cell from the memory at the first mobile terminal.

In Example 97, the subject matter of any one of Examples 93 to 96 can optionally include further including if the system information of the target cell is included in the received system information of the one or more proximate cells, determining at the mobile terminal whether the received system information of the target cell is valid, and wherein the applying the received system information of the target cell to transmit or receive data includes applying the received system information of the target cell to transmit or receive data if the received system information of the target cell is valid.

In Example 98, the subject matter of Example 97 can optionally include wherein the determining whether the received system information of the target cell is valid includes determining if a validity tag included in a first system information message of the target cell matches with a validity tag included in a second system information message of the target cell, the first system information message being included in the received system information of the one or more proximate cells.

In Example 99, the subject matter of Example 98 can optionally include further including receiving, at the first mobile terminal, the second system information message from the target cell.

In Example 100, the subject matter of Example 98 can optionally include wherein the first system information message of the target cell and the second system information message of the target cell are the same system information message type.

In Example 101, the subject matter of Example 98 can optionally include wherein the first system information message of the target cell and the second system information message of the target cell are System Information Block Type 1 (SIB1) in accordance with a Long Term Evolution (LTE) network.

In Example 102, the subject matter of Example 98 can optionally include wherein the first system information message of the target cell and the second system information message of the target cell are Master Information Blocks (MIB) in accordance with a Universal Mobile Telecommunications (UMTS) network.

In Example 103, the subject matter of Example 98 can optionally include wherein the applying the received system information of the target cell to transmit or receive data if the received system information of the target cell is valid includes applying a third system information message of the target cell included in the received system information of the one or more proximate cells to transmit or receive data if the received system information of the target cell is valid.

In Example 104, the subject matter of any one of Examples 93 to 103 can optionally include wherein the transmitting communication data indicating a serving cell includes transmitting communication data including cell identity information of the serving cell.

In Example 105, the subject matter of any one of Examples 93 to 104 can optionally include wherein the applying the received system information of the target cell to transmit or receive data includes utilizing the received system information of the target cell to transmit or receive data with the target cell.

In Example 106, the subject matter of Example 105 can optionally include further including establishing a wireless connection with the target cell at the first mobile terminal, and wherein the utilizing the received system information of the target cell to transmit or receive data with the target cell includes utilizing the received system information of the target cell to transmit or receive data with the target cell after establishing a connection with the target cell.

In Example 107, the subject matter of Example 106 can optionally include wherein the establishing a wireless connection with the target cell includes performing cell selection or reselection from the serving cell to the target cell.

In Example 108, the subject matter of Example 106 can optionally include wherein the establishing a wireless connection with the target cell includes performing handover from the serving cell to the target cell.

In Example 109, the subject matter of any one of Examples 93 to 104 can optionally include wherein the applying the received system information of the target cell to transmit or receive data includes identifying cell identity information of the target cell using the received system information of the target cell, and transmitting a reporting message to the serving cell including the cell identity information of the target cell.

In Example 110, the subject matter of any one of Examples 93 to 109 can optionally include wherein the transmitting communication data indicating a serving cell includes transmitting the communication data including geographical location information.

In Example 111, the subject matter of Example 110 can optionally include further including identifying the serving cell at the server using the communication data including the geographical location information.

In Example 112, the subject matter of Example 111 can optionally include wherein the identifying the serving cell at the server using the communication data including the geographical location information includes identifying a candidate cell that is geographically proximate to the geographical location information as the serving cell.

In Example 113, the subject matter of any one of Examples 93 to 104 can optionally include wherein the applying the received system information of the target cell to transmit or receive data includes transmitting a reporting message including cell identity information of the target cell at the first mobile terminal, the reporting message intended for the serving cell.

In Example 114, the subject matter of Example 113 can optionally include wherein the applying the received system information of the target cell to transmit or receive data further includes identifying the cell identity information of the target cell using the received system information of the target cell, and wherein the transmitting a reporting message intended for the serving cell including cell information of the target cell includes transmitting the reporting message intended for the serving cell including the cell identity information of the target cell.

In Example 115, the subject matter of Example 114 can optionally include wherein the reporting message is a Cell Global Identification (CGI) reporting message.

In Example 116, the subject matter of Example 115 can optionally include wherein the system information of the target cell includes information of a System Information Block Type 1 (SIB1) of the target cell according to a Long Term Evolution (LTE) network configuration.

In Example 117, the subject matter of Example 93 can optionally include further including transmitting, at the first mobile terminal, additional communication data including system information of the serving cell, the additional communication data intended for the server.

In Example 118, the subject matter of Example 117 can optionally include wherein the additional communication data further includes cell identity information of the serving cell.

In Example 119, the subject matter of any one of Examples 93 to 118 can optionally include further including receiving, at the first mobile terminal, system information of the serving cell from the serving cell, and transmitting first additional communication data including the received system information of the serving cell at the first mobile terminal, the first additional communication data intended for the server.

In Example 120, the subject matter of Example 119 can optionally include further including transmitting, at the first mobile terminal, second additional communication data including cell identity information of one or more neighbor cells of the serving cell.

In Example 121, the subject matter of Example 119 can optionally include wherein the first additional communication data further includes cell identity information of the serving cell.

In Example 122, the subject matter of any one of Examples 93 to 121 can optionally include further including transmitting, at the first mobile terminal, additional communication data including cell identity information of the serving cell.

In Example 123, the subject matter of any one of Examples 93 to 122 can optionally include further including transmitting, at the first mobile terminal, additional communication data including cell identity information of one or more neighbor cells of the serving cell, the communication data intended for the server.

In Example 124, the subject matter of any one of Examples 93 to 122 can optionally include further including performing, at the first mobile terminal, cell search or cell measurement in order to detect one or more neighbor cells of the serving cell, and transmitting, at the mobile terminal, additional communication data including cell identity information of the one or more neighbor cells, the communication data intended for the server.

In Example 125, the subject matter of Example 124 can optionally include wherein the additional communication data further includes cell measurement information of the one or more neighbor cells.

In Example 126, the subject matter of any one of Examples 93 to 125 can optionally include further including receiving, at the server, system information of a first proximate cell of the one or more proximate cells of the first cell from a third mobile terminal, and wherein the received system information of the one or more proximate cells of the first cell includes the received system information of the first proximate cell of the one or more proximate cells.

In Example 127, the subject matter of Example 126 can optionally include further including receiving, at the server, system information of a second proximate cell of the one or more proximate cells from a fourth mobile terminal.

In Example 128, the subject matter of Example 127 can optionally include wherein the received system information of the one or more proximate cells of the first cell includes the received system information of the second proximate cell of the one or more proximate cells.

In Example 129, the subject matter of Example 128 can optionally include wherein the identifying one or more proximate cells of the first cell using the neighbor cell identity information includes selecting the one or more neighbor cells of the first cell as included in the one or more proximate cells of the first cell.

In Example 130, the subject matter of any one of Examples 93 to 125 can optionally include further including receiving, at the server, neighbor cell identity information of one or more additional neighbor cells of the first cell from a third mobile terminal, and updating, at the server, a proximate cell list for the first cell based on the neighbor cell identity information of the one or more additional neighbor cells In Example 131, the subject matter of Example 130 can optionally include wherein the identifying one or more proximate cell of the first cell using the neighbor cell identity information includes identifying one or more proximate cell of the first cell using the proximate cell list.

In Example 132, the subject matter of Example 130 can optionally include further including receiving, at the server, neighbor cell measurement information of one or more further neighbor cells of the first cell from a third mobile terminal, and updating, at the server, the proximate cell list for the first cell based on the neighbor cell measurement information of the one or more further neighbor cells.

In Example 133, the subject matter of any one of Examples 93 to 129 can optionally include further including receiving, at the server, neighbor cell measurement information of one or more additional neighbor cells of the first cell from a third mobile terminal, and wherein the identifying one or more proximate cells of the first cell using the neighbor cell identity information includes identifying the one or more proximate cells of the first cell using the neighbor cell measurement information.

In Example 134, the subject matter of any one of Examples 93 to 133 can optionally include further including storing, at the server, the neighbor cell identity information of the one or more neighbor cells in a memory.

In Example 135, the subject matter of any one of Examples 93 to 133 can optionally include further including retrieving, at the server, the received system information of the one or more proximate cells from a memory.

In Example 136, the subject matter of any one of Examples 93 to 133, can optionally further include receiving the system information of the one or more proximate cells from a third mobile terminal.

In Example 137, the subject matter of any one of Examples 93 to 133 can optionally include further including storing, at the server, the received system information of the one or more proximate cells in a memory in encoded form.

Example 138 is a mobile terminal device including a radio processing circuit configured to transmit communication data indicating a serving cell, the communication data intended for a server and receive system information of one or more proximate cells of the serving cell in response to the communication data. The mobile terminal device further includes a baseband processing circuit configured to determine if system information of a target cell is included in the received system information of the one or more proximate cells, and, if the system information of the target cell is included in the received system information of the one or more proximate cells, apply the received system information of the target cell to control the radio processing circuit to transmit or receive data.

In Example 139, the subject matter of Example 138 can optionally include wherein the radio processing circuit is further configured to if the system information of the target cell is not included in the received system information of the one or more proximate cells, receive the system information of the target cell from the target cell.

In Example 140, the subject matter of Example 138 or 139 can optionally further include a memory, wherein the baseband processing circuit is configured to store the received system information of the one or more proximate cells of the serving cell in a memory.

In Example 141, the subject matter of Example 140 can optionally include wherein the baseband processing circuit is further configured to if the system information of the target cell is included in the received system information of the one or more proximate cells, retrieving the received system information of the target cell from the memory.

In Example 142, the subject matter of any one of Examples 138 to 141 can optionally include wherein the baseband processing circuit is further configured to if the system information of the target cell is included in the received system information of the one or more proximate cells, determine whether the received system information of the target cell is valid, and wherein the applying the received system information of the target cell to control transmitting or receiving data includes applying the system information of the target cell to control the radio processing circuit to transmit or receive data if the received system information of the target cell is valid.

In Example 143, the subject matter of Example 142 can optionally include wherein the determining whether the received system information of the target cell is valid includes determining if a validity tag included in a first system information message of the target cell matches with a validity tag included in a second system information message of the target cell, the first system information message being included in the received system information of the one or more proximate cells.

In Example 144, the subject matter of Example 143 can optionally include wherein the radio processing circuit is configured to receive the second system information message from the target cell.

In Example 145, the subject matter of Example 143 or 144 can optionally include wherein the first system information message of the target cell and the second system information message of the target cell are the same system information message type.

In Example 146, the subject matter of any one of Examples 143 to 145 can optionally include wherein the first system information message of the target cell and the second system information message of the target cell are System Information Block Type 1 (SIB1) in accordance with a Long Term Evolution (LTE) network.

In Example 147, the subject matter of any one of Examples 143 to 145 can optionally include wherein the first system information message of the target cell and the second system information message of the target cell are Master Information Blocks (MIB) in accordance with a Universal Mobile Telecommunications System (UMTS) network.

In Example 148, the subject matter of any one of Examples 143 to 147 can optionally include wherein the applying the received system information of the target cell to control the radio processing circuit to transmit or receive data if the received system information of the target cell is valid includes applying a third system information message of the target cell included in the received system information of the one or more proximate cells to control the radio processing circuit to transmit or receive data if the received system information of the target cell is valid.

In Example 149, the subject matter of any one of Examples 138 to 148 can optionally include wherein the transmitting communication data indicating a serving cell includes transmitting communication data including cell identity information of the serving cell.

In Example 150, the subject matter of any one of Examples 138 to 148 can optionally include wherein the applying the received system information of the target cell to control the radio processing circuit to transmit or receive data includes utilizing the received system information of the target cell to control the radio processing circuit to transmit or receive data with the target cell.

In Example 151, the subject matter of Example 150 can optionally include wherein the baseband processing circuit is further configured to establish a wireless connection with the target cell, and wherein utilizing the received system information of the target cell to control the radio processing circuit to transmit or receive data with the target cell includes utilizing the received system information of the target cell to control the radio processing circuit to transmit or receive data with the target cell after establishing a connection with the target cell.

In Example 152, the subject matter of Example 151 can optionally include wherein the establishing a wireless connection with the target cell includes performing cell selection or reselection from the serving cell to the target cell.

In Example 153, the subject matter of Example 151 can optionally include wherein the establishing a wireless connection with the target cell includes performing handover from the serving cell to the target cell.

In Example 154, the subject matter of any one of Examples 138 to 149 can optionally include wherein the applying the received system information of the target cell to control the radio processing circuit to transmit or receive data includes identifying cell identity information of the target cell using the received system information of the target cell, and controlling the radio processing circuit to transmit a reporting message including the cell identity information of the target cell intended for the serving cell.

In Example 155, the subject matter of any one of Examples 138 to 154 can optionally include wherein the transmitting communication data indicating a serving cell includes transmitting the communication data including geographical location information.

In Example 156, the subject matter of Example 138 can optionally include wherein the applying the received system information of the target cell to control the radio processing circuit to transmit or receive data includes controlling the radio processing circuit to transmit a reporting message including cell information of the target cell intended for the serving cell.

In Example 157, the subject matter of Example 156 can optionally include wherein the applying the received system information of the target cell to control the radio processing circuit to transmit or receive data further includes identifying cell identity information of the target cell using the received system information of the target cell, and wherein the controlling the radio processing circuit to transmit a reporting message including cell information of the target cell intended for the serving cell includes controlling the radio processing circuit to transmit the reporting message including the cell identity information of the target cell intended for the serving cell.

In Example 158, the subject matter of Example 157 can optionally include wherein the reporting message is a Cell Global Identification (CGI) reporting message.

In Example 159, the subject matter of Example 157 or 158 can optionally include wherein the system information of the target cell includes information of a System Information Block Type 1 (SIB1) of the target cell according to a Long Term Evolution (LTE) network configuration.

In Example 160, the subject matter of any one of Examples 138 to 159 can optionally include wherein the radio processing circuit is further configured to transmit additional communication data including system information of the serving cell.

In Example 161, the subject matter of Example 160 can optionally include wherein the additional communication data further includes cell identity information of the serving cell.

In Example 162, the subject matter of any one of Examples 138 to 159 can optionally include wherein the radio processing circuit is further configured to receive system information of the serving cell from the serving cell, and transmit first additional communication data including the received system information of the serving cell to the server.

In Example 163, the subject matter of Example 162 can optionally include wherein the radio processing circuit is further configured to transmit second additional communication data including cell identity information of one or more neighbor cells of the serving cell.

In Example 164, the subject matter of Example 162 can optionally include wherein the first additional communication data further includes cell identity information of the serving cell.

In Example 165, the subject matter of any one of Examples 138 to 159 can optionally include wherein the radio processing circuit is further configured to transmit additional communication data including cell identity information of the serving cell.

In Example 166, the subject matter of any one of Examples 138 to 162 can optionally include wherein the radio processing circuit is further configured to transmit additional communication data including cell identity information of one or more neighbor cells of the serving cell, the communication data intended for the server.

In Example 167, the subject matter of any one of Examples 138 to 162 can optionally include wherein the baseband processing circuit is further configured to perform cell search or cell measurement in order to detect one or more neighbor cells of the serving cell, and control the radio processing circuit to transmit additional communication data including cell identity information of the one or more neighbor cells, the communication data intended for the server.

In Example 168, the subject matter of Example 167 can optionally include wherein the additional communication data further includes cell measurement information of the one or more neighbor cells.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device comprising a radio processing circuit configured to:
   transmit communication data indicating a serving cell, the communication data intended for a server and receive system information of one or more proximate cells of the serving cell indicated by the communication data;
   receive system information of the serving cell from the serving cell; and
   transmit additional communication data comprising the received system information of the serving cell to the server;
   the mobile terminal device further comprising a baseband processing circuit configured to determine if system information of a target cell is included in the received system information of the one or more proximate cells, and, if the system information of the target cell is included in the received system information of the one or more proximate cells, apply the received system information of the target cell to control the radio processing circuit to transmit or receive data.

2. The mobile terminal device of claim 1, wherein the radio processing circuit is further configured to:
   if the system information of the target cell is not included in the received system information of the one or more proximate cells, receive new system information of the target cell from the target cell.

3. The mobile terminal device of claim 1, further comprising a memory,
   wherein the baseband processing circuit is configured to store the received system information of the one or more proximate cells of the serving cell in a memory.

4. The mobile terminal device of claim 3, wherein the baseband processing circuit is further configured to:
   if the system information of the target cell is included in the received system information of the one or more proximate cells, retrieving the received system information of the target cell from the memory.

5. The mobile terminal device of claim 1, wherein the baseband processing circuit is further configured to:
   if the system information of the target cell is included in the received system information of the one or more proximate cells, determine whether the received system information of the target cell is valid;
   and wherein the applying the received system information of the target cell to control transmitting or receiving data comprises applying the system information of the target cell to control the radio processing circuit to transmit or receive data if the received system information of the target cell is valid.

6. The mobile terminal device of claim 5, wherein the determining whether the received system information of the target cell is valid comprises:
   determining if a validity tag included in a first system information message of the target cell matches with a validity tag included in a second system information message of the target cell, the first system information message being included in the received system information of the one or more proximate cells.

7. The mobile terminal device of claim 6, wherein the radio processing circuit is configured to receive the second system information message from the target cell.

8. The mobile terminal device claim 1, wherein the transmitting communication data indicating a serving cell comprises
   transmitting communication data comprising cell identity information of the serving cell.

9. The mobile terminal device of claim 1, wherein the applying the received system information of the target cell to control the radio processing circuit to transmit or receive data comprises:

utilizing the received system information of the target cell to control the radio processing circuit to transmit or receive data with the target cell.

10. The mobile terminal device of claim 9, wherein the baseband processing circuit is further configured to establish a wireless connection with the target cell, and wherein utilizing the received system information of the target cell to control the radio processing circuit to transmit or receive data with the target cell comprises:

utilizing the received system information of the target cell to control the radio processing circuit to transmit or receive data with the target cell after establishing a connection with the target cell.

11. The mobile terminal device of claim 1, wherein the applying the received system information of the target cell to control the radio processing circuit to transmit or receive data comprises:

identifying cell identity information of the target cell using the received system information of the target cell; and controlling the radio processing circuit to transmit a reporting message comprising the cell identity information of the target cell intended for the serving cell.

12. The mobile terminal device of claim 1, wherein the baseband processing circuit is further configured to:

perform cell search or cell measurement in order to detect one or more neighbor cells of the serving cell; and control the radio processing circuit to transmit additional communication data comprising cell identity information of the one or more neighbor cells, the communication data intended for the server.

13. A server having a memory and a processor adapted to perform processing on stored data, the server configured to:

receive neighbor cell identity information of one or more neighbor cells of a first cell, the neighbor cell identity information derived from a first mobile terminal;

receive communication data indicating that the first cell is a serving cell of a second mobile terminal, the communication data derived from the second mobile terminal;

identify one or more proximate cells of the first cell using the neighbor cell identity information; and transmit system information of the one or more proximate cells to the second mobile terminal.

14. The server of claim 13, further configured to receive system information of a first proximate cell of the one or more proximate cells of the first cell, the received system information of the first proximate cell of the one or more proximate cells derived from a third mobile terminal, wherein the received system information of the one or more proximate cells of the first cell includes the received system information of the first proximate cell of the one or more proximate cells.

15. The server of claim 13, wherein the identifying one or more proximate cells of the first cell using the neighbor cell identity information comprises:

selecting the one or more neighbor cells of the first cell as included in the one or more proximate cells of the first cell.

16. A method in a mobile device for performing wireless communications comprising:

transmitting communication data indicating a serving cell, the communication data intended for a server;

receiving system information of one or more proximate cells of the serving cell indicated in the communication data;

determining if system information of a target cell is included in the received system information of the one or more proximate cells;

if the system information of the target cell is included in the received system information of the one or more proximate cells, applying the received system information of the target cell in the mobile device to transmit or receive data;

receiving system information of the serving cell from the serving cell; and transmitting first additional communication data comprising the received system information of the serving cell to the server.

17. The method of claim 16, further comprising:

if the system information of the target cell is not included in the received system information of the one or more proximate cells, receiving new system information of the target cell from the target cell.

18. The method of claim 16, wherein the applying the received system information of the target cell to transmit or receive data comprises:

utilizing the received system information of the target cell to transmit or receive data with the target cell.

19. The method of claim 18, further comprising establishing a wireless connection with the target cell, and wherein the utilizing the received system information of the target cell to transmit or receive data with the target cell comprises:

utilizing the received system information of the target cell to transmit or receive data with the target cell after establishing a connection with the target cell.

20. The method of claim 16, further comprising:

performing cell search or cell measurement in order to detect one or more neighbor cells of the serving cell; and transmitting additional communication data comprising cell identity information of the one or more neighbor cells, the communication data intended for the server.

21. A method in a server for performing wireless communications comprising:

receiving neighbor cell identity information of one or more neighbor cells of a first cell, the neighbor cell identity information of the one or more neighbor cells of the first cell derived from a first mobile terminal;

receiving communication data from a second mobile terminal indicating that the first cell is a serving cell of the second mobile terminal;

identifying one or more proximate cells of the first cell using the neighbor cell identity information; and transmitting system information of the one or more proximate cells to the second mobile terminal.

22. The method of claim 21, further comprising:

receiving system information of a first proximate cell of the one or more proximate cells of the first cell, the received system information derived from a third mobile terminal, and wherein the received system information of the one or more proximate cells of the first cell includes the received system information of the first proximate cell of the one or more proximate cells.

* * * * *